US009419256B2

(12) United States Patent
Tonomura et al.

(10) Patent No.: US 9,419,256 B2
(45) Date of Patent: Aug. 16, 2016

(54) BATTERY UNIT WITH PERIPHERAL BRACKET AND INTERNAL SUPPORT BODY

(75) Inventors: Yasuhiro Tonomura, Fukushima (JP); Tsutomu Aoyama, Fukushima (JP); Tatsuya Adachi, Fukushima (JP); Ryota Isshiki, Fukushima (JP); Tetsuo Inakawa, Fukushima (JP); Munenori Inden, Fukushima (JP); Ryo Tanabe, Fukushima (JP); Tsuyoshi Toukairin, Fukushima (JP)

(73) Assignee: Sony Corporation, Tokyo (JP)

( * ) Notice: Subject to any disclaimer, the term of this patent is extended or adjusted under 35 U.S.C. 154(b) by 621 days.

(21) Appl. No.: 13/222,211

(22) Filed: Aug. 31, 2011

(65) Prior Publication Data

US 2012/0064383 A1 Mar. 15, 2012

(30) Foreign Application Priority Data

Sep. 9, 2010 (JP) ................................. 2010-201918
Oct. 7, 2010 (JP) ................................. 2010-227749

(51) Int. Cl.
*H01M 10/655* (2014.01)
*H01M 2/02* (2006.01)
*H01M 2/10* (2006.01)

(52) U.S. Cl.
CPC ............ *H01M 2/021* (2013.01); *H01M 2/0212* (2013.01); *H01M 2/10* (2013.01); *H01M 10/655* (2015.04)

(58) Field of Classification Search
CPC .............................. H01M 2/10; H01M 2/0207
USPC .................................... 429/99, 151, 152, 154
See application file for complete search history.

(56) References Cited

U.S. PATENT DOCUMENTS

| 2004/0050414 | A1 | 3/2004 | Oogami | |
|---|---|---|---|---|
| 2005/0026014 | A1 | 2/2005 | Fogaing et al. | |
| 2005/0042511 | A1 | 2/2005 | Kaneta | |
| 2008/0280199 | A1* | 11/2008 | Kaneta | 429/162 |
| 2009/0197160 | A1* | 8/2009 | Fujiwara et al. | 429/146 |
| 2009/0208828 | A1 | 8/2009 | Kanai et al. | |
| 2009/0226800 | A1* | 9/2009 | Ueshima et al. | 429/120 |
| 2010/0009251 | A1 | 1/2010 | Shin et al. | |
| 2010/0266883 | A1* | 10/2010 | Koetting et al. | 429/96 |

(Continued)

FOREIGN PATENT DOCUMENTS

| CN | 1659724 | 8/2005 |
|---|---|---|
| CN | 101558151 | 10/2009 |

(Continued)

OTHER PUBLICATIONS

European Search Report issued Feb. 24, 2012, for corresponding European Appln. No. 11006822.8.

(Continued)

*Primary Examiner* — Maria J Laios
(74) *Attorney, Agent, or Firm* — K&L Gates LLP

(57) ABSTRACT

A battery unit includes a battery cell that charges and discharges electric power; and a bracket that has an outer peripheral wall portion surrounding an outer peripheral side of the battery cell, and a support body which is provided inside the outer peripheral wall portion and supports the battery cell, wherein two battery cells are inserted from a front surface side and a back surface side of the bracket into the outer peripheral wall portion and are mounted on both side surfaces of the support body.

11 Claims, 29 Drawing Sheets

(56) References Cited

U.S. PATENT DOCUMENTS

| | | | |
|---|---|---|---|
| 2010/0310909 A1* | 12/2010 | Yun et al. | 429/90 |
| 2011/0070474 A1* | 3/2011 | Lee et al. | 429/120 |
| 2012/0040223 A1* | 2/2012 | Odumodu | 429/120 |

FOREIGN PATENT DOCUMENTS

| | | | |
|---|---|---|---|
| DE | 102008016936 A1 | | 10/2008 |
| JP | 11-176400 | | 7/1999 |
| JP | 2006-260967 | | 9/2006 |
| JP | 2009-105058 | | 5/2009 |
| JP | 2010-049842 | | 3/2010 |
| WO | 2007/091757 A1 | | 8/2007 |
| WO | WO 2009057894 A1 * | | 5/2009 |

OTHER PUBLICATIONS

Japanese Patent Office, Office Action issued in connection with Japanese Patent Application No. 2010-227749, dated Jan. 30, 2014. (4 pages).

Chinese Office Action issued Sep. 26, 2014, for corresponding Chinese Appln. No. 2011102570612.

* cited by examiner

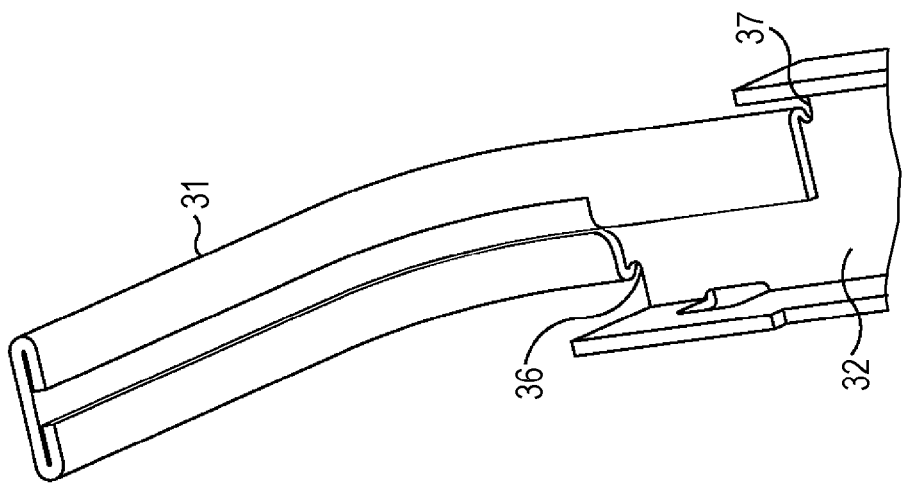
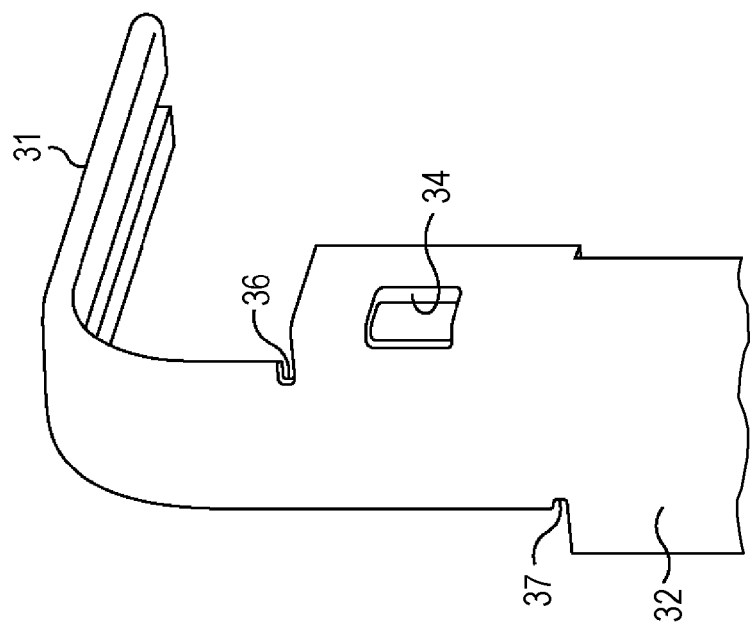
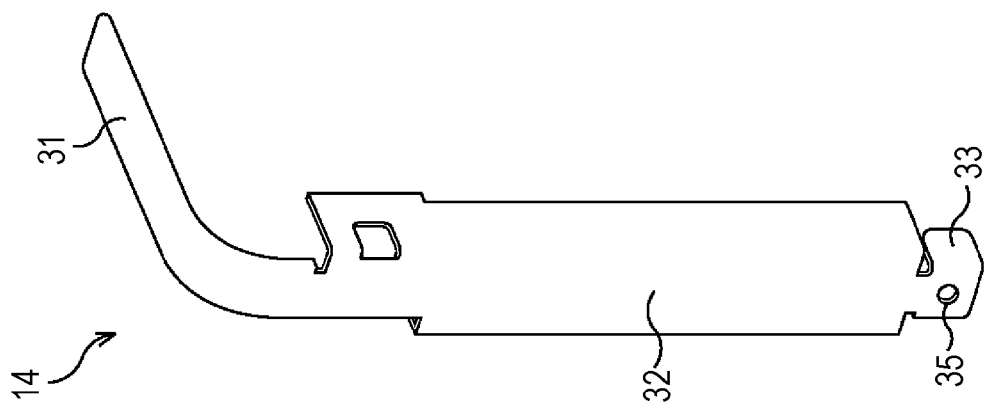

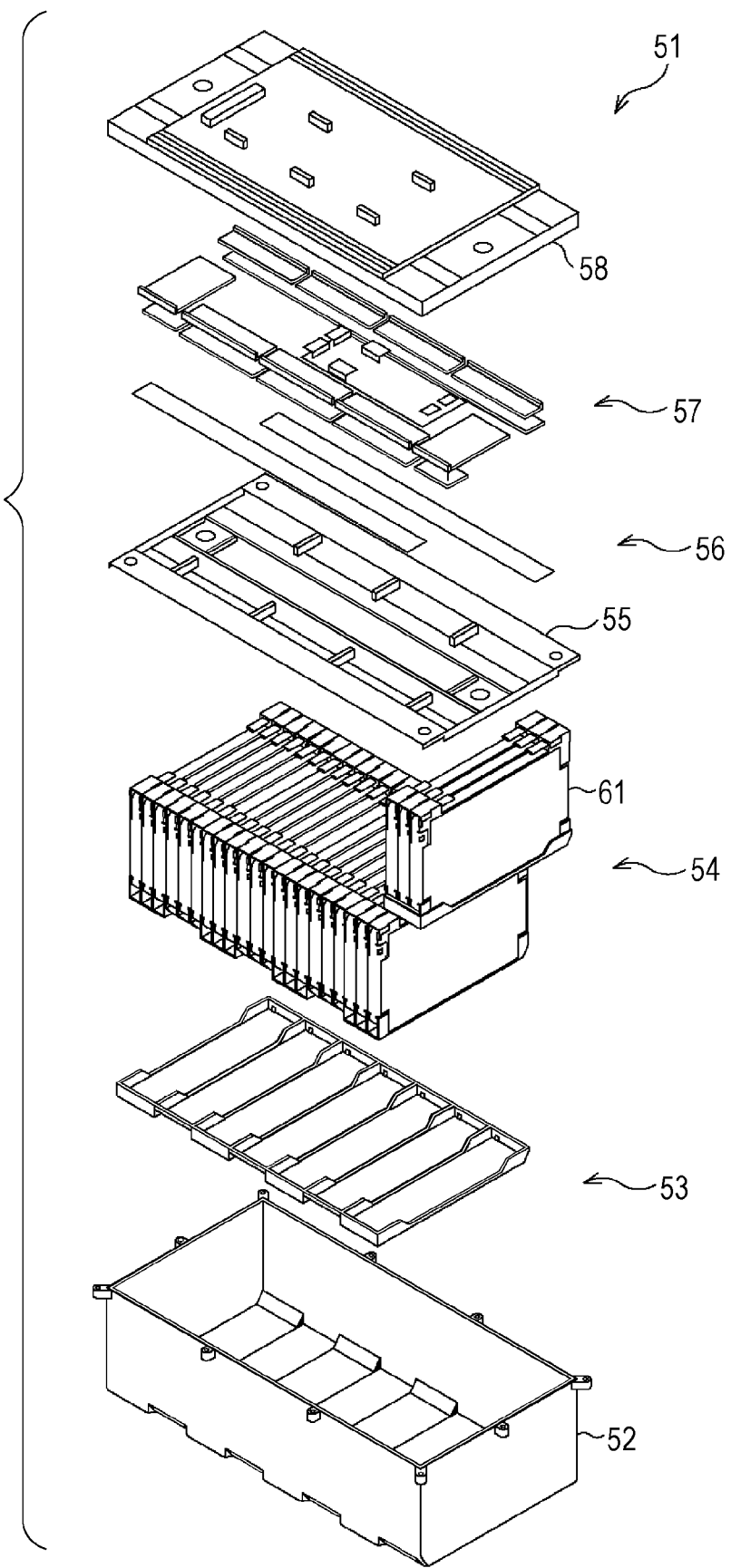

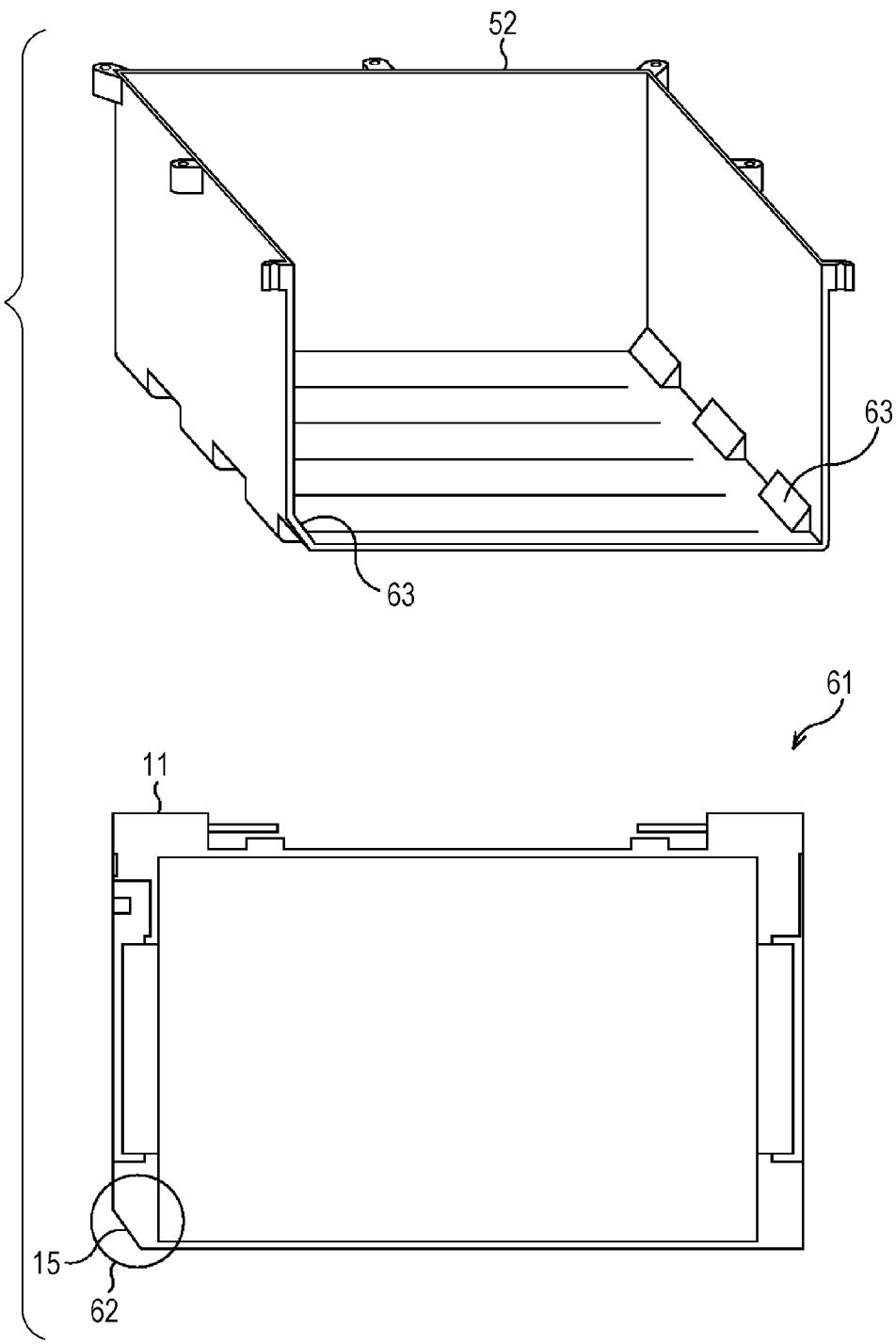

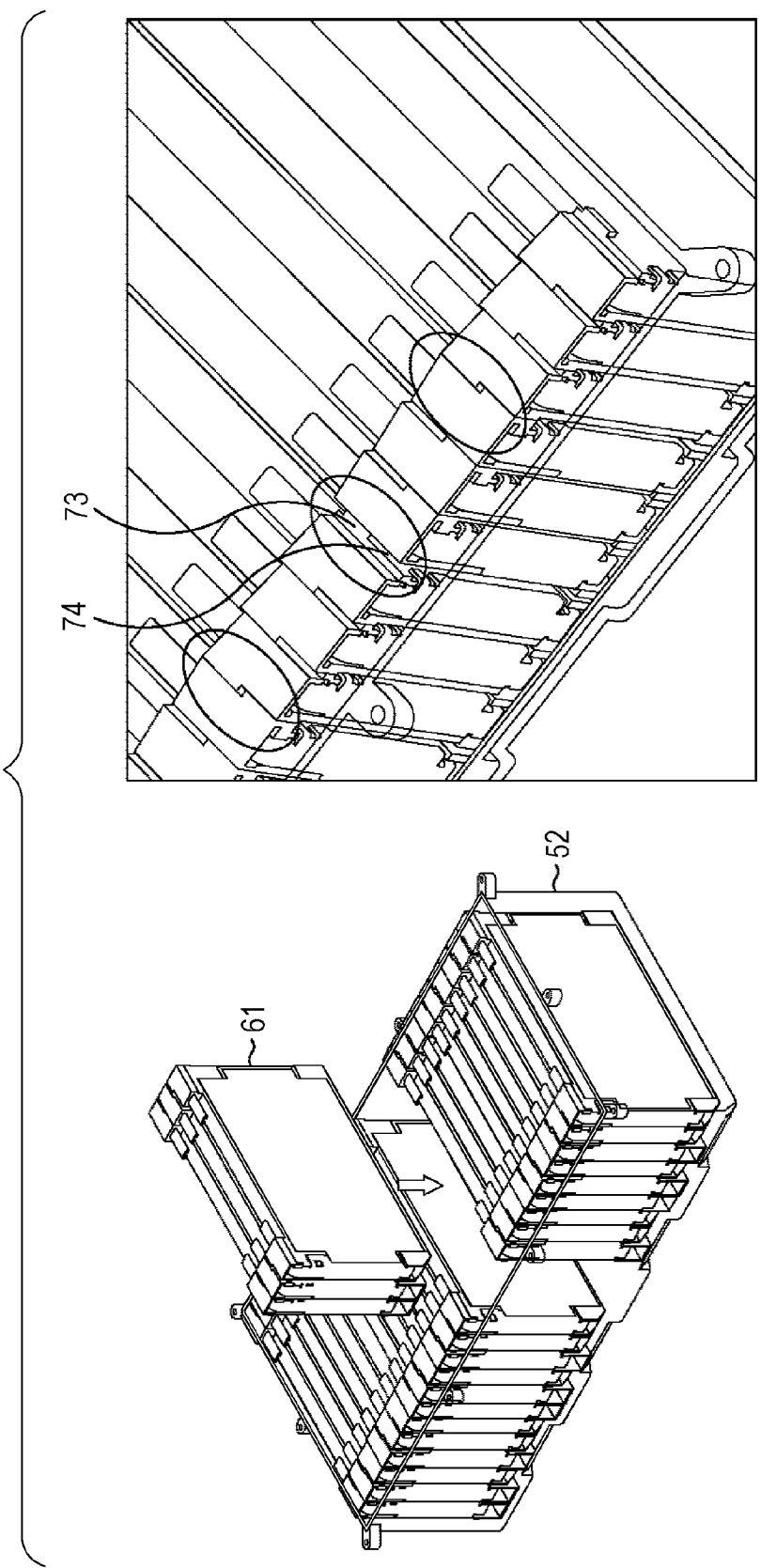

BATTERY UNIT WITH PERIPHERAL BRACKET AND INTERNAL SUPPORT BODY

CROSS REFERENCES TO RELATED APPLICATIONS

The present application claims priority to Japanese Priority Patent Application JP 2010-201918 filed in the Japan Patent Office on Sep. 9, 2010 and Japanese Priority Patent Application JP 2010-227749 filed in the Japan Patent Office on Oct. 7, 2010, the entire contents of which are hereby incorporated by reference.

BACKGROUND

The present application relates to a battery unit, particularly, a battery unit that has high energy density and is resistant to external stress.

In the related art, development of more safe and high convenient battery unit is expected as an important point toward the spread of electric motor vehicles or a smart grid.

For example, Japanese Unexamined Patent Application Publication No. 2009-105058 discloses an assembled battery that can be effectively assembled and can safely perform the wiring operation.

SUMMARY

From the past, various battery units are developed, but a battery unit will be necessary which has a high energy density and is resistant to external stress in the future.

It is desirable to provide a battery unit that has a high energy density and is resistant to external stress.

According to an embodiment, there is provided a battery unit which includes a battery cell that charges and discharges electric power; and a bracket that has an outer peripheral wall portion surrounding an outer peripheral side of the battery cell, and a support body that is provided inside the outer peripheral wall portion and supports the battery cell, wherein two battery cells are inserted from a front surface side and a back surface side of the bracket into the outer peripheral wall portion and are mounted on both side surfaces of the support body.

In an embodiment, the battery unit includes the battery cell that charges and discharges electric power; and the bracket that has an outer peripheral wall portion surrounding an outer peripheral side of the battery cell, and the support body that is provided inside the outer peripheral wall portion and supports the battery cell. Moreover, two battery cells are inserted from the front surface side and the back surface side of the bracket into the outer peripheral wall portion and are mounted on both side surfaces of the support body.

According to an embodiment, it is possible to provide a battery unit that has a high energy density and is resistant to external stress.

Additional features and advantages are described herein, and will be apparent from the following Detailed Description and the figures.

BRIEF DESCRIPTION OF THE FIGURES

FIGS. 8A to 8C are diagrams that describe shapes of the bus bar;

FIG. 9 is a diagram that describes a configuration example of a battery module with a battery unit combined therewith;

FIG. 12 is a diagram that describes a scheme for preventing a mistake in the insertion direction of the parallel block;

FIG. 15 is a diagram that shows an example of the case where the parallel block is inserted into a module case in a correct direction;

DETAILED DESCRIPTION

Embodiments of the present application will be described below in detail with reference to the drawings.

Figure 1A:
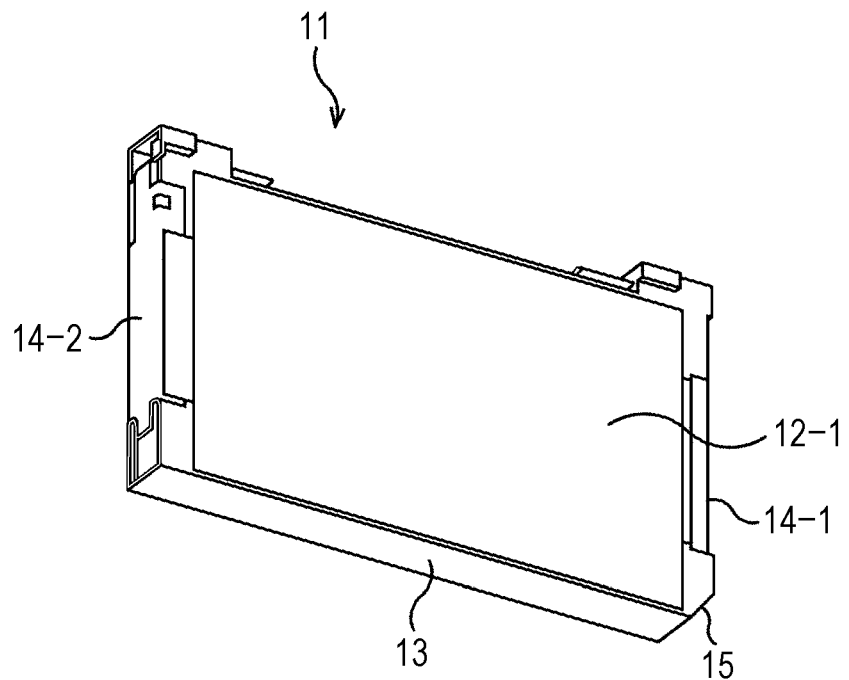
FIGS. 1A and 1B are perspective views that show configuration examples of a first embodiment of a battery unit to which an embodiment is applied.
Figure 1B:
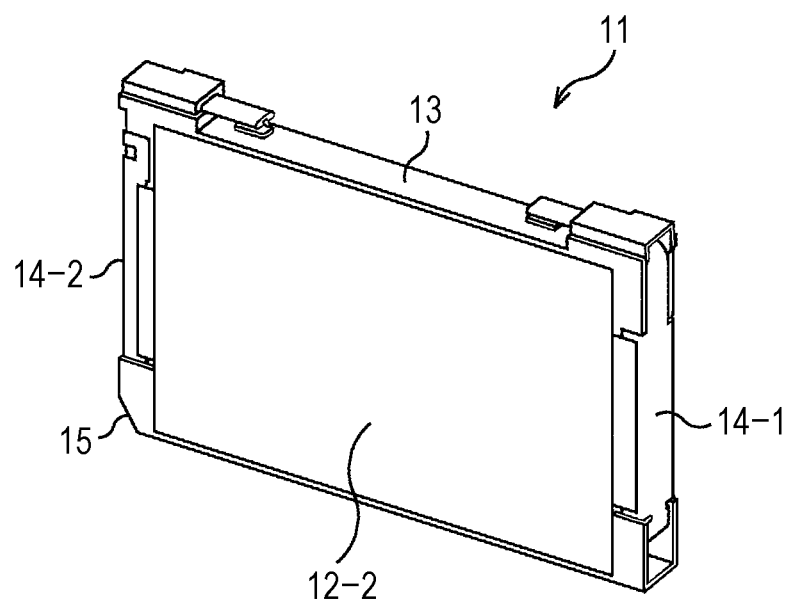

FIGS. 1A and 1B are perspective views that show a configuration of a first embodiment of a battery unit to which an embodiment is applied.

FIGS. 1A and 1B show a battery unit 11 that is viewed from different sides, respectively, a side mainly shown in FIG. 1A is a front surface side of the battery unit 11, and a side mainly shown in FIG. 1B is a back surface side of the battery unit 11.

As shown in FIGS. 1A and 1B, the battery unit 11 includes battery cells 12-1 and 12-2, a bracket 13, and bus bars 14-1 and 14-2.

The battery cells 12-1 and 12-2 are provided such that a battery element, for example, including a battery material such as lithium ion metal oxide is packaged using an insulation sheet such as a laminate film to constitute a cell main body, and an electrode terminal for charging or discharging electric power on both side surfaces of the cell main body is electrically connected to the battery element.

The bracket 13 is a support tool for securing strength of the battery cells 12-1 and 12-2, the battery cell 121 is mounted on the front surface side of the bracket 13, and the battery cell 122 is mounted on the back surface side of the bracket 13. In addition, bracket 13 has substantially the same shape even when viewed from any side of the front surface side and the back surface side, but a chamfered portion 15 is formed in one lower corner portion, a side where the chamfered portion 15 is viewed in a right down is a front surface side, and a side where the chamfered portion 15 is viewed in a left down is a back surface side.

The bus bars 14-1 and 14-2 are metallic members having an approximately L shape and are mounted on both side surfaces of the bracket 13 so that the connection portion to be connected to the electrode terminals of the battery cells 12-1 and 12-2 are disposed on the side surface of the bracket 13 and the terminal to be connected to the outside of the battery unit 11 is disposed on the upper surface of the bracket 13.

Figure 2:
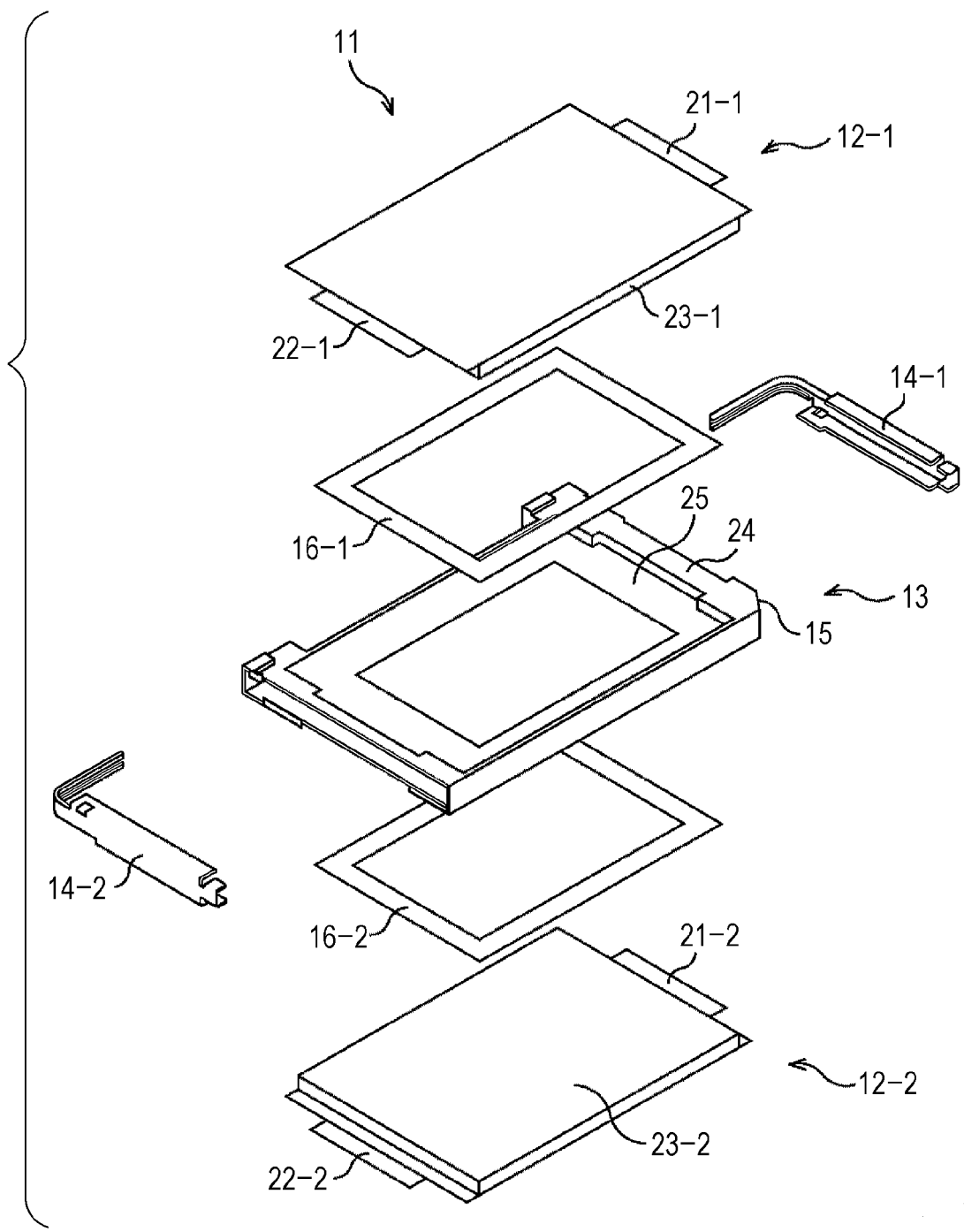
FIG. 2 is a perspective view of a state in which a battery unit is disassembled.

Next, FIG. 2 shows a perspective view in the state in which the battery unit 11 is disassembled, the upper side of FIG. 2 is a front surface side of the battery unit 11, and the downside of FIG. 2 is the back surface side of the battery unit 11.

As shown in FIG. 2, the battery cell 121 has electrode terminals 21-1 and 22-1 formed so as to be protruded outward from both side surfaces of a square plate-shaped cell main body 23-1, respectively. The electrode terminals 21-1 and 22-1 are provided so as to be extended along one surface (a surface of the front surface side in an example of FIG. 2) of the cell main body 23-1. Thus, the battery cell 121 has a convex shape in which the cell main body 23-1 is protruded from the surface with the electrode terminals 21-1 and 22-1 provided thereon.

Similarly, the battery cell 122 has a convex shape in which the electrode terminals 21-2 and 22-2 are provided on the other surface (a surface of the back surface side in the example of FIG. 2) of the cell main body 23-2 and the cell main body 23-2 is protruded from the surface with the electrode terminals 21-2 and 22-2 provided thereon.

Moreover, the battery cells 12-1 and 12-2 are mounted on the bracket 13 in the state of being combined toward the cell main bodies 23-1 and 23-2 side having the convex shape. That is, the battery cells 12-1 and 12-2 are mounted on the bracket 13 so that the surface with the electrode terminals 21-1 and 22-1 provided thereon faces the front surface side and the surface with the electrode terminals 21-2 and 22-2 faces the back surface side, respectively.

The bracket 13 has an outer peripheral wall 24 and a rib portion 25. The outer peripheral wall 24 is slighter wider than the outer peripheries of the cell main bodies 23-1 and 23-2 of the battery cells 12-1 and 12-2, that is, the outer peripheral wall 24 is formed so as to surround the cell main bodies 23-1 and 23-2 in the state in which the battery cells 12-1 and 12-2 are mounted. The rib portion 25 is formed on the inner side of the outer peripheral wall 24 so as to be extended inward from a central portion in the thickness direction of the outer peripheral wall 24.

In the configuration of FIG. 2, the battery cells 12-1 and 12-2 are inserted from the front surface side and the back surface side of the bracket 13 into the outer peripheral wall 24, and bonded to both side surfaces of the rib portion 25 of the bracket 13 by double-sided tapes 16-1 and 16-2 having adhesiveness on both sides. The double-sided tapes 16-1 and 16-2 have an approximately □ shape of a predetermined width along the outer peripheral ends of the battery cells 12-1 and 12-2, and the rib portion 25 of the bracket 13 may be provided by an area where the double-sided tapes 16-1 and 16-2 are bonded.

In this manner, the rib portion 25 is formed so as to be extended inward from the inside of the outer peripheral wall 24 by a predetermined width along the outer peripheral end of the battery cells 12-1 and 12-2, and the inside of the rib portion 25 is an opening portion. Thus, between the battery cell 121 bonded to the rib portion 25 by the double-sided tape 16-1 from the front surface side of the bracket 13 and the battery cell 122 bonded to the rib portion 25 by the double-sided tape 16-2 from the back surface side of the bracket 13, a gap is generated by the opening portion.

That is, since the opening portion is formed in the central portion of the bracket 13, the battery cells 12-1 and 12-2 are mounted on the bracket 13 to have a gap of a total dimension of the thickness of the rib portion 25 and the thickness of the double-sided tapes 16-1 and 16-2. For example, although a slight bulging is generated in the battery cells 12-1 and 12-2 due to charging or discharging or the generation of gas, the gap provided by the gap becomes a space that releases the bulging of the battery cells 12-1 and 12-2. Thus, it is possible to exclude the influence or the like in which the whole thickness of the battery unit 11 is increased by the bulging portion of the battery cells 12-1 and 12-2.

Furthermore, when bonding the battery cells 12-1 and 12-2 to the rib portion 25, in a case where the bonding area is wide, considerable pressure is necessary, but by limiting the bonding surface of the rib portion 25 to the outer peripheral end, it is possible to effectively apply the pressure and easily bond. As a result, it is possible to reduce stress applied to the battery cells 12-1 and 12-2 during manufacturing.

Furthermore, as described below using FIGS. 6A to 6C, the bus bars 14-1 and 14-2 are mounted on both side surfaces of the bracket 13 by the use of the claw and pressure-fit, respectively. The electrode terminal 21-1 of the battery cell 121 and the electrode terminal 21-2 of the battery cell 122 are bonded to the bus bar 14-1, and the electrode terminal 22-1 of the battery cell 121 and the electrode terminal 22-2 of the battery cell 122 are bonded to the bus bar 14-2.

As shown in FIG. 2, by attaching two battery cells 12-1 and 12-2 to one bracket 13, for example, it is possible to reduce the thickness and the space of the bracket 13 cases compared to the case of attaching one battery cell to one bracket. As a result, the energy density can be improved.

Furthermore, since the rigidity in the thickness direction of the battery unit 11 by a synergic effect that can bond two battery cells 12-1 and 12-2, the rib portion 25 of the bracket 13 can be thinned. That is, for example, even when the thickness of the rib portion 25 is equal to or less than 1 mm (about thickness limit of resin molding) of the rib portion 25, the battery cells 12-1 and 12-2 can be bonded on both side surfaces of the rib portion 25, whereby it is possible to obtain suitable rigidity in the battery unit 11 as a whole. Moreover, by thinning the thickness of the rib portion 25, the thickness of the battery unit 11 is thin and the volume is reduced, with the result that the energy density of the battery unit 11 can be improved.

Furthermore, in order to heighten tolerance to external stress, the battery unit 11 has a structure in which the outer peripheral surfaces (both sides and upper and lower surfaces) of the battery cells 12-1 and 12-2 do not come into contact with the inner peripheral surface of the outer peripheral wall 24 of the bracket 13, and the wide surfaces of the battery cells 12-1 and 12-2 are bonded to the rib portion 25.

Owing to such a configuration, it is possible to realize a battery unit 11 that has a high energy density and is resistant to external stress.

Next, the arrangements of the bus bars 14-1 and 14-2 will be described based on FIGS. 3A to 3C.

Figure 3A:
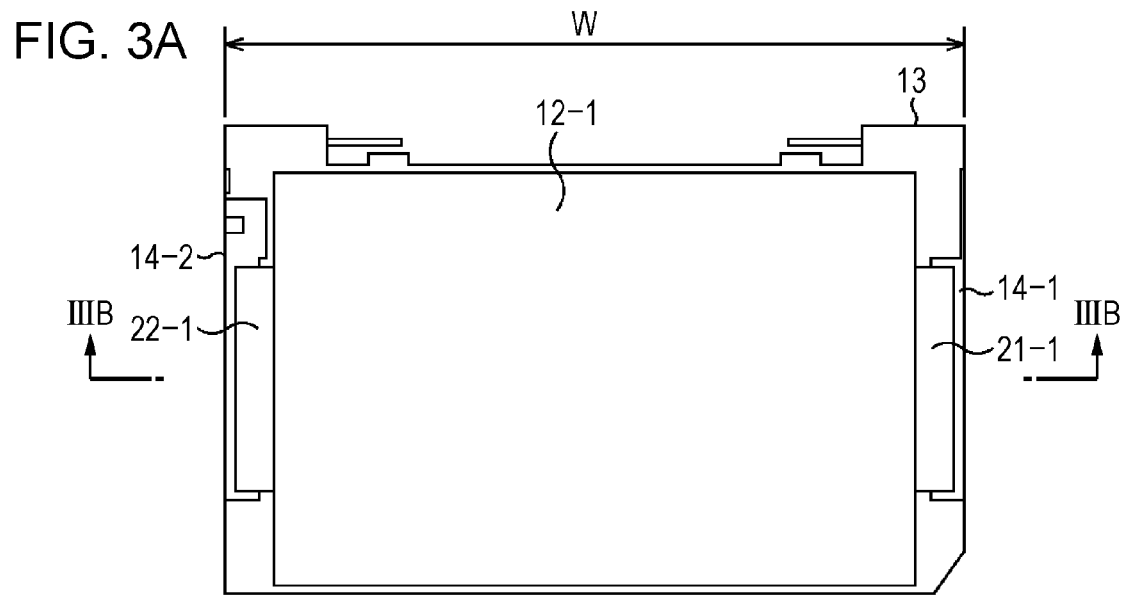
FIGS. 3A to 3C are diagrams that explain an arrangement of a bus bar.
Figure 3B:
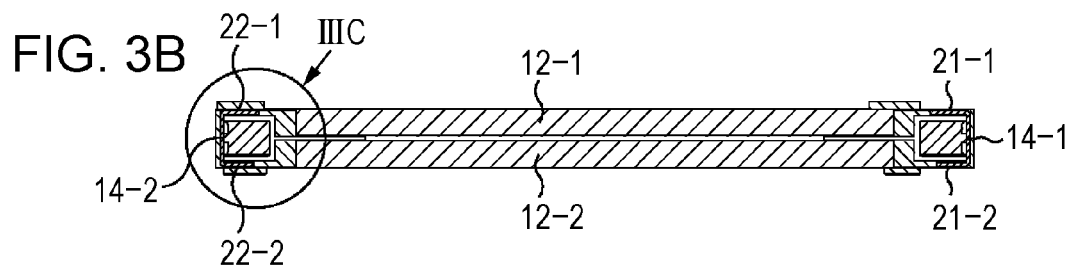
Figure 3C:
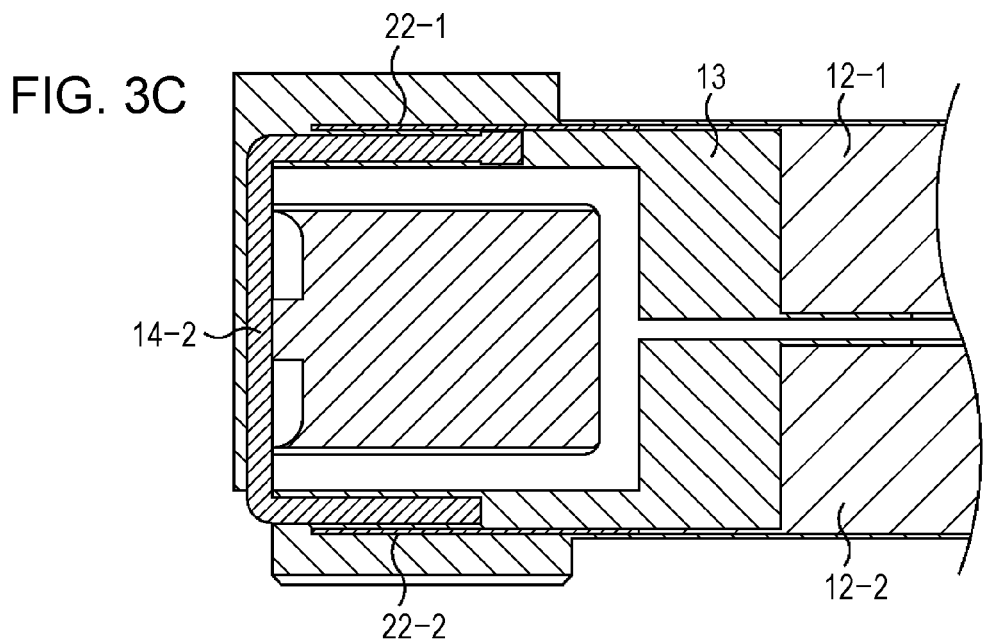

FIG. 3A shows a front view of the battery unit, FIG. 3B shows a cross-sectional view in the direction of an arrow shown in FIG. 3A, and FIG. 3C shows an exploded view of a left end portion in the cross-sectional view of FIG. 3B.

Herein, as mentioned above, the battery cells 12-1 and 12-2 are mounted on the bracket 13 in the state of being combined with each other toward the cell main bodies 23-1 and 23-2 sides having a convex shape. For that reason, between the electrode terminal 21-1 of the battery cell 121 and the electrode terminal 21-2 of the battery cell 122, a space corresponding to the thicknesses of the cell main bodies 23-1 and 23-2 is provided. Similarly, a space is also provided between the electrode terminal 22-1 of the battery cell 121 and the electrode terminal 22-2 of the battery cell 122. Thus, the bus bars 14-1 and 14-2 are disposed by the use of the space.

As shown in FIG. 3C, it is possible to dispose the bus bar 14-2 in the space formed between the electrode terminal 22-1 of the battery cell 121 and the electrode terminal 22-2 of the battery cell 122 to secure a seat surface upon welding the bus bar 14-2 and the electrode terminals 22-1 and 22-2, and it is possible to secure great cross-sectional area for causing a large electric current to flow.

Furthermore, by disposing the bus bars 14-1 and 14-2, it is possible to reduce the dimension W of the width direction of the battery unit 11 to promote a reduction in the size of the battery unit 11.

In addition, although the electrode terminals 21-1 and 22-1 of the battery cell 12-1 and the electrode terminals 21-1 and 22-2 of the battery cell 122 are disposed on both side surfaces of the battery unit 11, it is possible to integrate the terminal connected to the outside of the battery unit 11 on the upper surface side of the battery unit 11 by the bus bars 14-1 and 14-2.

Next, a protective structure of the battery cells 12-1 and 12-2 by the bracket 13 will be described with reference to FIGS. 4A and 4B.

Figure 4A:
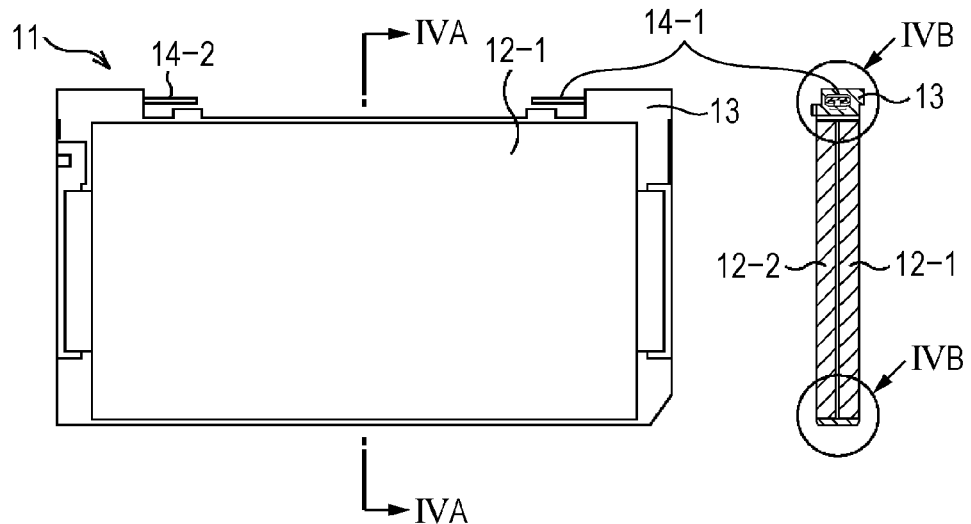
FIGS. 4A and 4B are diagrams that describe a protective structure of a battery cell.
Figure 4B:
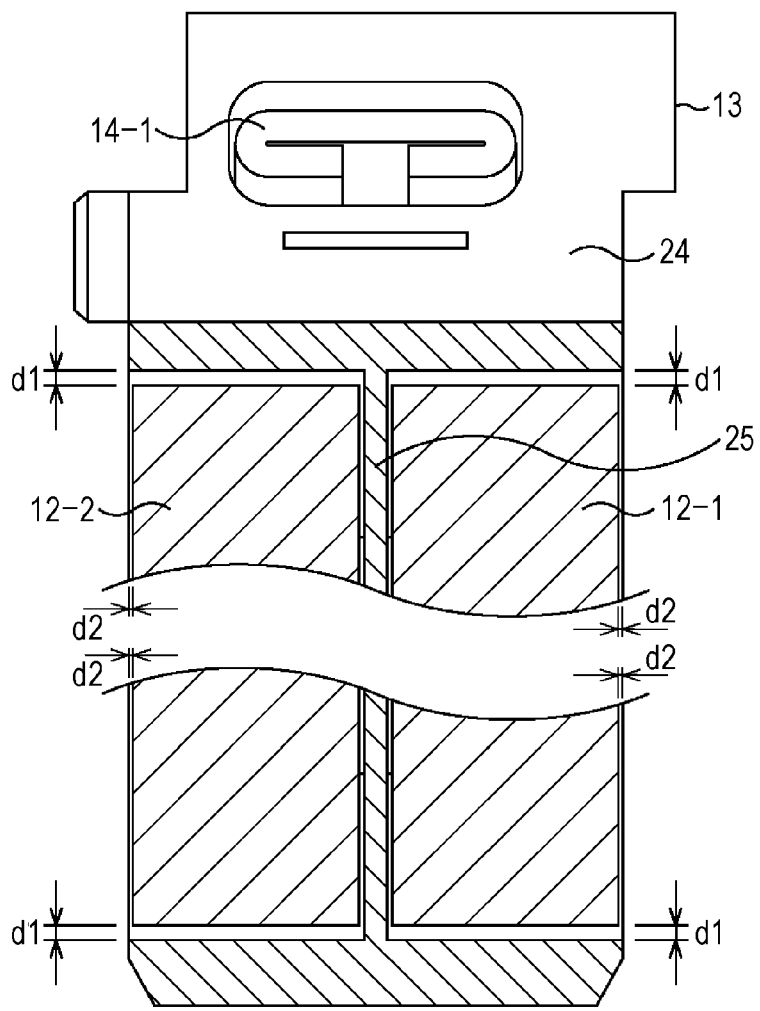

FIG. 4A shows a front view of the battery unit 11 and a cross-sectional view in the direction of an arrow IIIA-IIIA shown in the front view, and FIG. 4B shows an exploded view of upper and lower end portions in the cross-sectional view of FIG. 4A.

As mentioned above, the cell main bodies 23-1 and 23-2 of the battery cells 12-1 and 12-2 have their battery elements packaged using a laminate film or the like, and there is a necessity to protect them from stress or shock from the outside. For this reason, the bracket 13 has a structure that has a function of holding and protecting the battery cells 12-1 and 12-2 in combination.

As shown in FIG. 4B, the bracket 13 is formed so that a gap d1 is provided between the outer peripheral sides of the battery cells 12-1 and 12-2 and the inner peripheral side of the outer peripheral wall 24 in the state in which the battery cells 12-1 and 12-2 are mounted on the bracket 13.

That is, a longitudinal dimension of the outer peripheral wall 24 of the bracket 13 is designed so as to be a dimension of adding the upper gap d1 and the lower gap d1 to the longitudinal dimensions of the cell main bodies 23-1 and 23-2 of the battery cells 12-1 and 12-2. Similarly, a transverse dimension of the outer peripheral wall 24 of the bracket 13 is designed so as to be a dimension of adding the right gap d1 and the left gap d1 to the transverse dimensions of the cell main bodies 23-1 and 23-2 of the battery cells 12-1 and 12-2.

In this manner, since the outer peripheral side surfaces, which are low in strength, of the battery cells 12-1 and 12-2 are surrounded by the bracket 13 at the gap d1, shock from the outside being directly transmitted to the outer peripheral portions of the battery cells 12-1 and 12-2 is avoided. That is, the bracket 13 has a protective structure that protects the battery cells 12-1 and 12-2 from external shock.

Furthermore, the bracket 13 is formed so as to be higher than the thicknesses of the battery cells 12-1 and 12-2 by the gap d2. For example, the depth from the surface or the back of the outer peripheral wall 24 of the bracket 13 to the rib portion 25 is designed so as to be a dimension (in addition, in the case of using the double-sided tape 16 (FIG. 2), a dimension that considers the thickness of the double-sided tape 16) that adds the gap d2 to the thicknesses of the battery cells 12-1 and 12-2. As a result, the bracket 13 can also receive the stress in the thickness direction, which can protect the battery cells 12-1 and 12-2 from the stress in the thickness direction.

Next, a terminal connection structure of the battery cells 12-1 and 12-2 will be described with reference to FIGS. 5A to 5C.

Figure 5A:
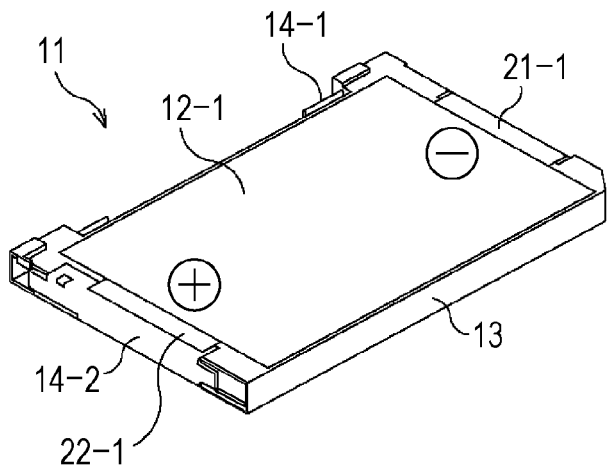
FIGS. 5A to 5C are diagrams that describe a terminal connection structure of the battery cell.
Figure 5B:
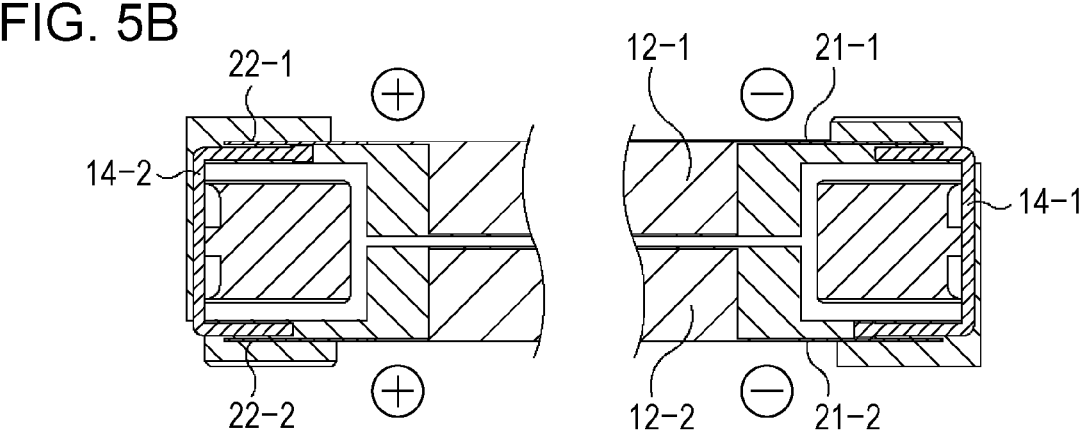
Figure 5C:
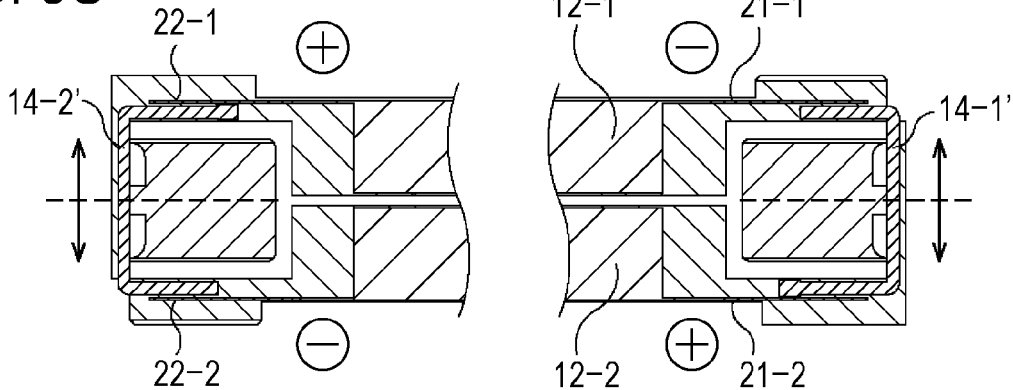

FIG. 5A is a perspective view of the battery unit 11, FIGS. 5B and 5C are exploded views of the terminal portion.

For example, as shown in FIG. 5A, the electrode terminal 21-1 of the battery cell 121 is a terminal of a negative side, and the electrode terminal 22-1 is a terminal of a positive side. Similarly, the electrode terminal 21-2 of the battery cell 122 is a terminal of a negative side, and the electrode terminal 22-2 is a terminal of a positive side.

In FIG. 5B, the electrode terminal 21-1 and the electrode terminal 21-2 are disposed to face each other and are connected to the bus bar 14-1, and the electrode terminal 22-1 and the electrode terminal 22-2 are disposed to face each other and are connected to the bus bar 14-2. In this manner, by the connection configuration in which the same poles are connected to each other as an opposite arrangement, the capacity of the battery unit 11 becomes twice that of the battery cell single body.

Furthermore, in FIG. 5C, the electrode terminal 21-1 and the electrode terminal 22-2 are disposed to face each other and are connected to the bus bar 14-1', and the electrode terminal 22-1 and the electrode terminal 22-2 are disposed to face each other and are connected to the bus bar 14-2'. In this manner, by the connection configuration in which the different poles are connected to each other as an opposite arrangement, the voltage of the battery unit 11 becomes twice that of the battery cell single body. In addition, unlike the bus bars 14-1 and 14-2, the bus bars 14-1' and 14-2' adopt a structure which is divided into two parts by a dotted line shown in FIG. 5C.

In this manner, in the battery unit 11, by selecting the directions of the battery cells 12-1 and 12-2 upon being mounted on the bracket 13 and adopting a suitable bus bar, the connection between the same poles or between the different poles is possible. Furthermore, by the use of the low cost battery cells 12-1 and 12-2, it is possible to create the battery unit 11 of a serious consideration of capacity or a serious consideration of voltage at low cost.

Next, a connection structure between the bracket 13 and the bus bars 14-1 and 14-2 will be described with reference to FIGS. 6A to 6C.

Figure 6A:
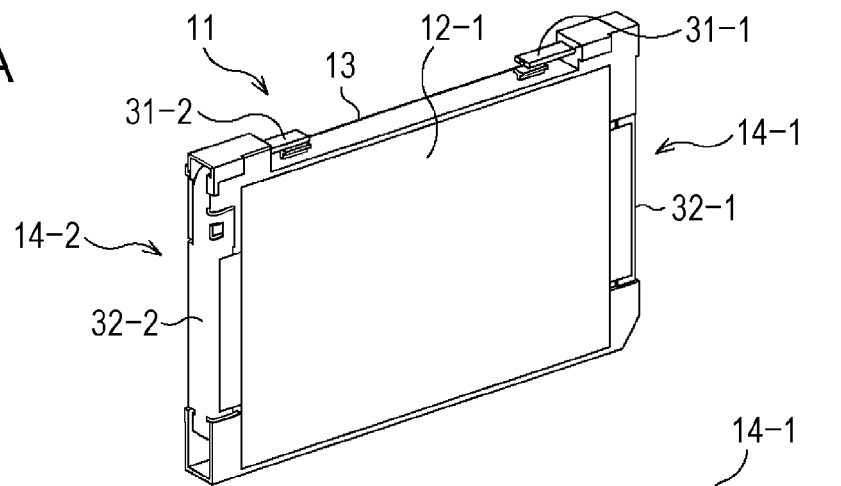
FIGS. 6A to 6C are diagrams that describe a connection structure between a bracket and a bus bar.
Figure 6B:
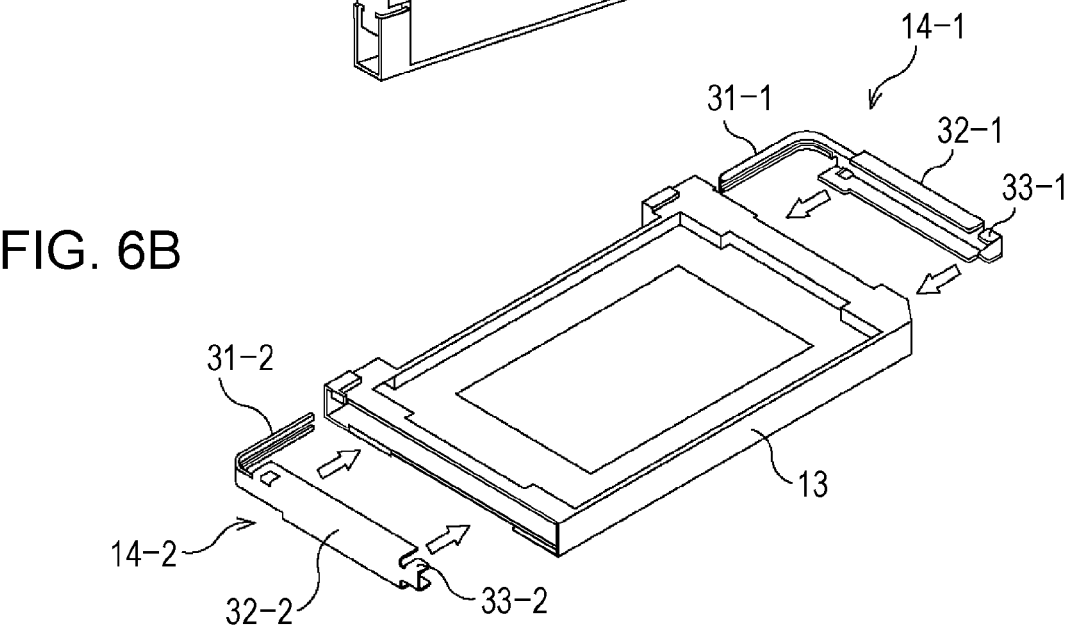
Figure 6C:
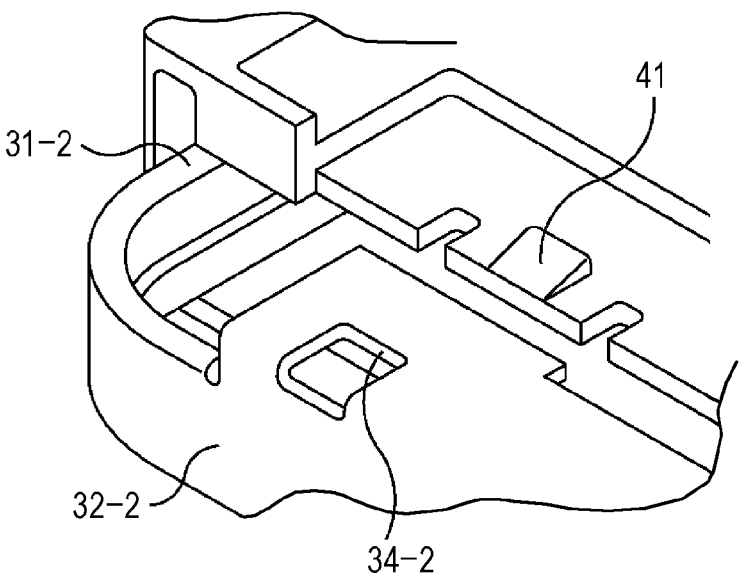

FIG. 6A shows a perspective view of the battery unit 11, FIG. 6B shows a perspective view of the bracket 13 and the bus bars 14-1 and 14-2, and FIG. 6C shows an exploded view of the connection portion.

As shown in FIG. 6A, the bus bars 14-1 and 14-2 are mounted from both side surfaces of the bracket 13 so that the terminals 31-1 and 31-2 to be electrically connected to the outside of the battery unit 11 are disposed on the upper surface side of the bracket 13. Moreover, in the bus bars 14-1 and 14-2, the side surface portions 32-1 and 32-2 to be disposed on the side surface of the bracket 13 are fixed to the bracket 13.

Herein, in a fixing method of fixing the bus bars 14-1 and 14-2 to the bracket 13, a one-touch installation without using a screw is adopted, and for example, the fixing is performed by a fixing method using a pressure-fit and a fixing method using a claw.

In the fixing method using the pressure-fit, pressure-fit portions 33-1 and 33-2 formed in the lower end portions (the end portion of an opposite side of a side where the terminals 31-1 and 31-2 are provided) of the bus bars 14-1 and 14-2 are used. The pressure-fit portions 33-1 and 33-2 have an approximately U-shaped cross section, and the exterior dimensions of both sides are designed to dimensions capable of being pressure-fitted with respect to the dimension of a groove formed on the side of the bracket 13.

Furthermore, in the fixing method using the claw, notch portions formed near the upper ends of the side surface portions 32-1 and 32-2 of the bus bars 14-1 and 14-2 are used. In FIG. 6C, the vicinity of the notch portion 34-2 formed in the bus bar 14-2 is shown in an enlarged manner, and a claw portion 41 corresponding to the notch portion 34-2 is formed in the bracket 13. Thus, by plugging the bus bar 14-2 into the bracket 13 from the side surface, the claw portion 41 is engaged with the notch portion 34-2, and the bus bar 14-2 is fixed to the bracket 13. Similarly, although it is not shown, the bus bar 14-1 is also fixed by the use of the claw portion 41 and the notch portion 34-2.

In this manner, the bus bars 14-1 and 14-2 are fixed to the bracket 13, whereby, a design having a screw length necessary in terms of strength is not necessary but the battery unit 11 can be reduced in size, for example, compared to the case of adopting the fixing method using the screw. Furthermore, by adopting the fixing method using the pressure-fit and the claw, it is possible to fix the bus bars 14-1 and 14-2 to the bracket 13 with minimum effort.

Furthermore, since force due to the terminal or the connector is applied to the terminals 31-1 and 31-2, by adopting the fixing by the claw on the terminals 31-1 and 31-2 side of the side surface portions 32-1 and 32-2, the bus bars 14-1 and 14-2 are prevented from being removed from the bracket 13.

In the bus bars 14-1 and 14-2, plating is performed so as to have corrosion resistance. Generally, in the processing of performing the plating, it is necessary that the components are suspended by a wire, and it is necessary that suspension holes for suspending by a wire are also provided in the bus bars 14-1 and 14-2. In the case of providing the suspension hole in a portion where the electric current passes through the bus bars 14-1 and 14-2 when being assembled as the battery unit 11, since the cross-sectional areas of the bus bars 14-1 and 14-2 are reduced, this case is undesirable upon causing a large electric current to flow.

Thus, the suspension holes (through holes) provided in the bus bars 14-1 and 14-2 will be described with reference to FIGS. 7A to 7C.

Figure 7A:
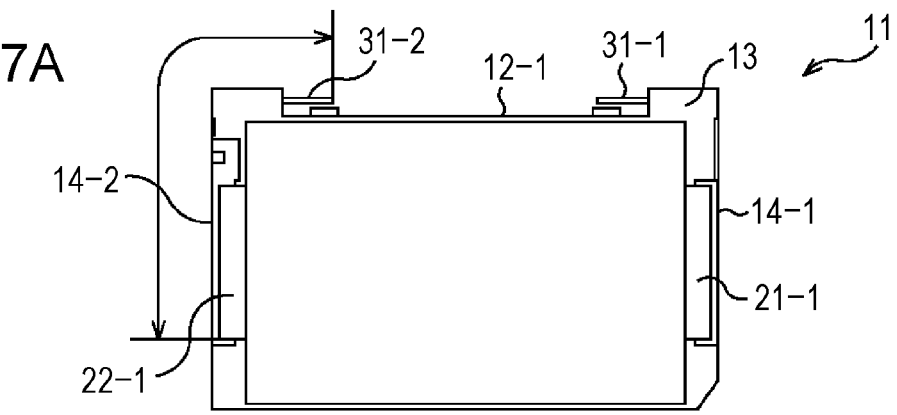
FIGS. 7A to 7C are diagrams that describe a hanging hole provided in the bus bar.
Figure 7B:
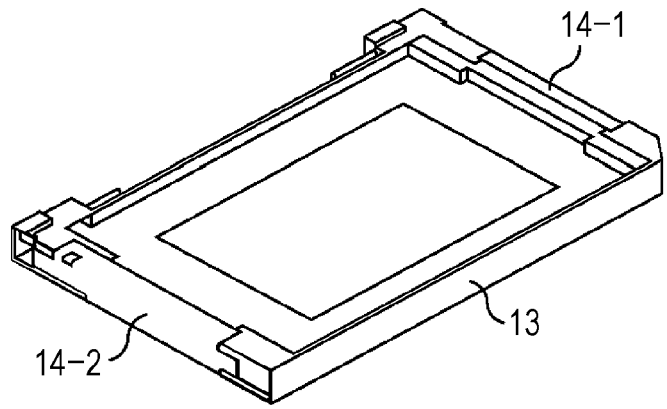
Figure 7C:
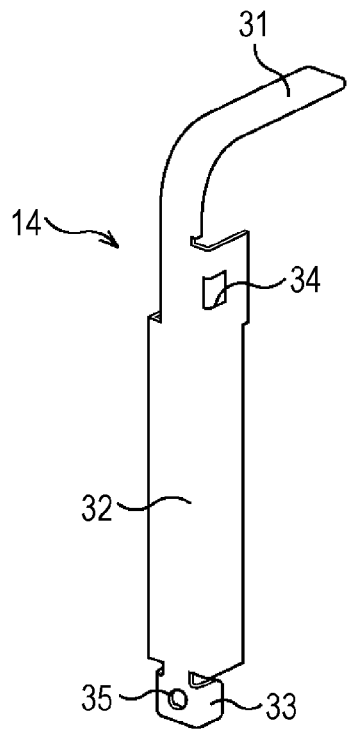

FIG. 7A shows a front view of the battery unit 11, FIG. 7B shows a perspective view of the state in which the bracket 13, and the bus bars 14-1 and 14-2 are combined with each other, and FIG. 7C shows a perspective view of the bus bar 14.

In FIG. 7A, a range shown in the bus bar 14-2 by an arrow, that is, a range from a position depending on the lower end of the electrode terminal 22-1 of the battery cell 121 to a tip of the terminal 31-2 is a range through which the electric current passes.

Thus, outside the range through which the electric current passes, that is, as shown in FIG. 7C, in a pressure-fit portion 33 provided in the lower end of the bus bar 14, a suspension hole 35 is formed. In this manner, by providing the suspension hole 35 outside the range through which the electric current passes, it is possible to avoid a reduction in cross-sectional area of the range through which the electric current passes.

Furthermore, the bus bar 14 plays the role of collecting and transmitting the electric current from the battery cells 12-1 and 12-2, but, in order to cause a large electric current to flow, a certain degree of cross-sectional area is necessary. Since it is difficult to make the width of the terminal 31 wider than the width of the battery unit 11, in some cases, it is difficult to achieve a sufficient width due to a geometric constraint. Thus, in the bus bar 14, the cross-section area is secured without widening the width by folding back (hemming bend) the material.

The shape of the bus bar 14 will be described based on FIGS. 8A to 8C.

FIG. 8A shows a perspective view of the bus bar 14, and FIGS. 8B and 8C show enlarged views of the vicinity of the terminal 31.

As shown in FIGS. 8A to 8C, in the bus bar 14, the side surface portion 32 connected to the electrode terminals 21 or 22 of the battery cell 12 has a shape in which the metal plate material is bent in the form of an approximate U shape. On the contrary, it is necessary that the terminal 31 is thin to fit the width of the battery unit 11, the terminal 31 has a structure in which the metal plate material is folded back in this portion.

Furthermore, in this manner, in the case of folding back the metal plate material, a notch necessary after the working is formed in the base thereof, and notches 36 and 37 are formed in the bus bar 14. Herein, the formed positions of the notches 36 and 37 are shifted. For example, if the notches 36 and 37 are formed from the opposite sides of the same position, respectively, the cross-section in partially becomes thin in that position.

Thus, by shifting the forming position of the notches 36 and 37 along the direction in which the electric current passes through the bus bar 14, it is possible to avoid the cross-section becoming partially thin.

The battery unit 11 is configured as mentioned above, and a plurality of battery units 11 is combined with each other so that a predetermined voltage can be obtained.

Next, a configuration example of a battery module will be described in which the battery units 11 are combined with each other based on FIG. 9.

The battery module 51 includes a module case 52, a rubber sheet portion 53, a battery portion 54, a battery cover 55, a fixing sheet portion 56, an electric part portion 57, and a module cover 58.

The module case 52 is a case for storing the battery unit 11 and mounting the same on the equipment used, and in the configuration example of FIG. 9, the module case 52 has a dimension capable of storing 24 battery units 11.

The rubber sheet portion 53 is a sheet that is laid on the bottom surface of the battery unit 11 to mitigate shock or the like. In the rubber sheet portion 53, a sheet of rubber sheet is provided for each three battery units 11, and eight rubber sheets are provided so as to cope with 24 battery units 11.

In the configuration example of FIG. 9, the battery portion 54 is configured so that 24 battery units 11 are combined with each other. Furthermore, the battery portion 54 has a connection configuration in which three battery units 11 are connected to each other in parallel to configure a parallel block 61, and eight parallel blocks 61 are connected to each other in series.

The battery cover 55 is a cover for fixing the battery portion 54, and is provided with an opening corresponding to the terminal 31 of the bus bar 14 of the battery unit 11.

The fixing sheet portion 56 is a sheet which is disposed on the upper surface of the battery cover 55, comes into close contact with the battery cover 55 and the module cover 58 and is fixed thereto when the module cover 58 is fixed to the module case 52.

The electric part portion 57 has electric components such as a metal plate material that connects the terminal 31 of the bus bar 14 of the battery unit 11 or a charging or discharging control circuit that controls the charging or the discharging of the battery unit 11. The charging or discharging circuit is disposed in a space, for example, between the bus bars 14 forming two rows in the battery portion 54.

The module cover 58 is a cover for closing the module case 52 after each portion is stored in the module case 52.

Herein, a parallel block 61, in which three battery units 11 are connected to each other, is connected to the battery module 51 in series, whereby the battery portion 54 is configured, and the series connection is performed by the metal plate material included in the electric part portion 57. Thus, in the battery portion 54, the parallel blocks 61 are disposed, respectively, so that the direction of the terminal is alternated for each parallel block 61, that is, a positive terminal and a negative terminal are aligned by the parallel blocks 61 adjacent to each other. Thus, in the battery module 51, there is a necessity for a scheme of avoiding the terminals of the same poles being aligned by the parallel blocks 61 adjacent to each other.

Figure 10:
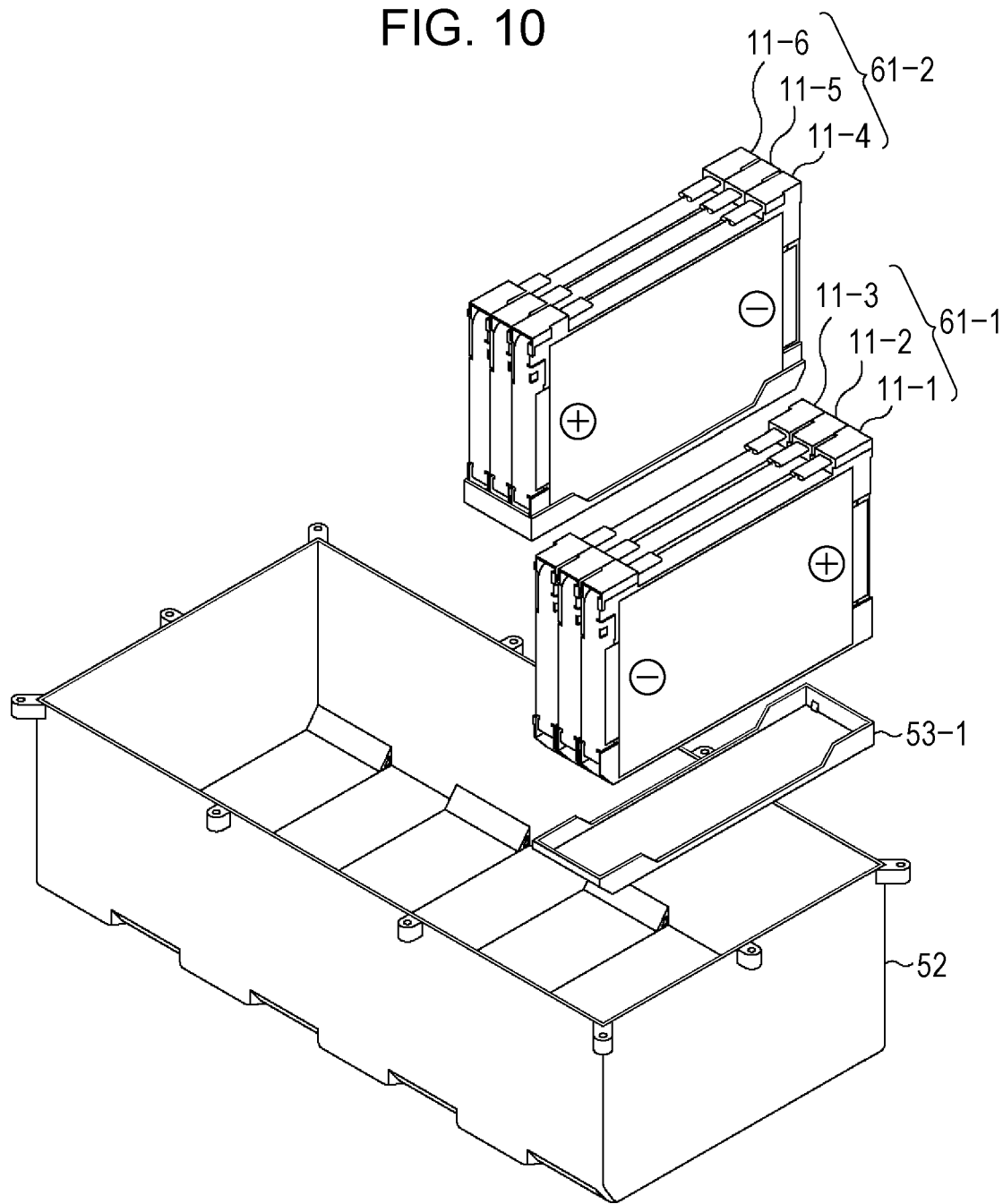
FIG. 10 is a diagram that describes a direction of a terminal of a parallel block.

For example, as shown in FIG. 10, a parallel block 61-1 constituted by the battery units 11-1 to 11-3 and a parallel block 61-2 constituted by the battery units 11-4 to 11-6 are stored within the module case 52 by an arrangement in which the positive terminal is adjacent to the negative terminal.

In order to restrict to be such an arrangement, a chamfered portion 15 formed in one corner portion of the downside of the bracket 13 of the battery unit 11 is used.

Figure 11A:
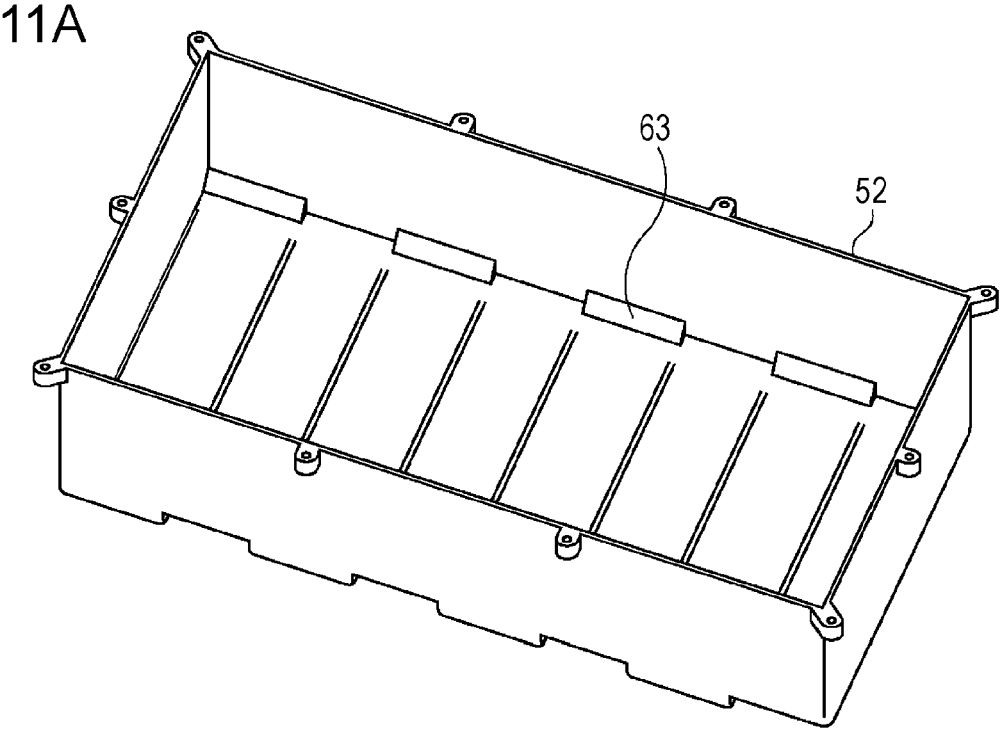
FIGS. 11A and 11B are diagrams that describe a scheme for preventing a mistake in the insertion direction of the parallel block.
Figure 11B:
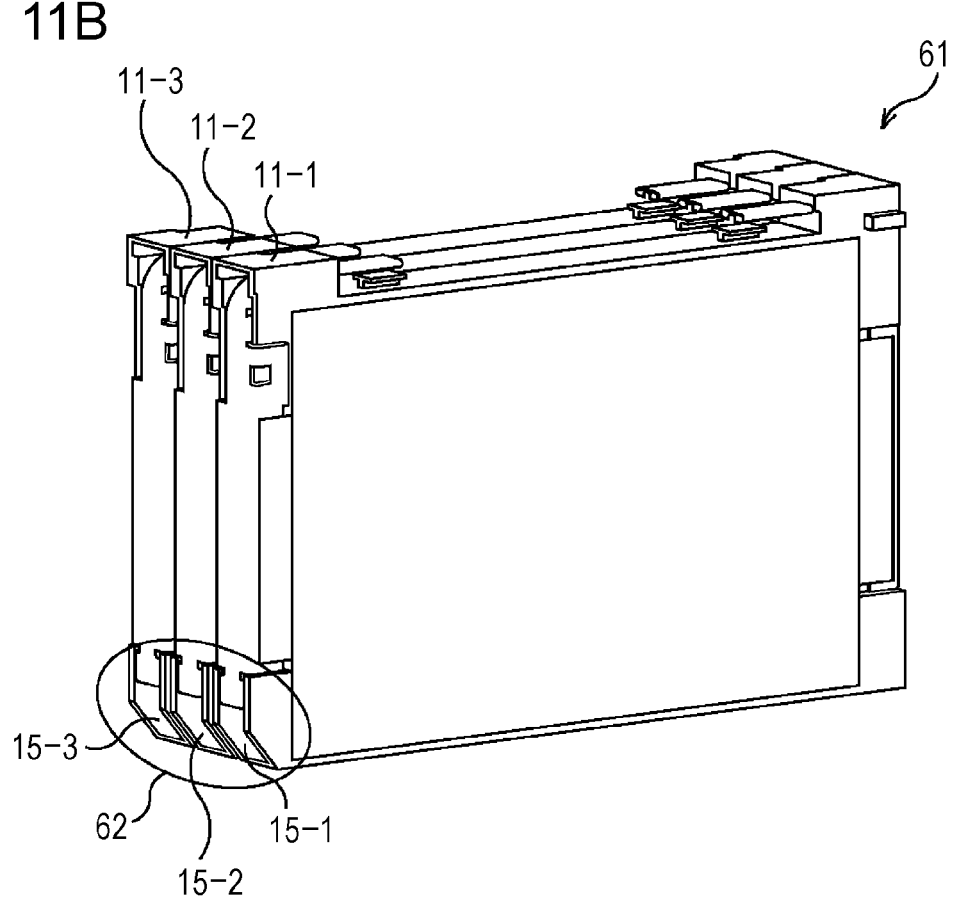

For example, as shown in FIGS. 11A, 11B and 12, in the parallel block 61, the battery units 11-1 to 11-3 are combined to each other so that the respective chamfered portions 15-1 to 15-3 are in the same direction, thereby forming the chamfered region 62. Moreover, in the module case 52, slope portions 63 depending on the slope of the chamfered region 62 are formed, and the slope portions 63 are alternately disposed by a length depending on the thickness of three battery units 11.

In this manner, when storing of the parallel block 61 in the module case 52 in an incorrect direction is attempted by the chamfered region 62 of the parallel block 61 and the slope portion 63 of the module case 52, the corner portion of the lower side of the parallel block 61 comes into contact with the slope portion 63 of the module case 52. In this case, since the parallel block 61 floats from the bottom surface of the module case 52, the parallel block 61 is not completely stored in the module case 52. As a result, in the battery module 51, terminals of the same poles being arranged adjacent to each other by the parallel block 61 adjacent to each other is avoided.

Next, description will be given of a configuration in which the battery units 11 are combined to each other in the same direction upon configuring the parallel block 61 and the mistake in the direction upon inserting the parallel block 61 into the module case 52 is prevented with reference to FIGS. 13 to 16.

Figure 13:
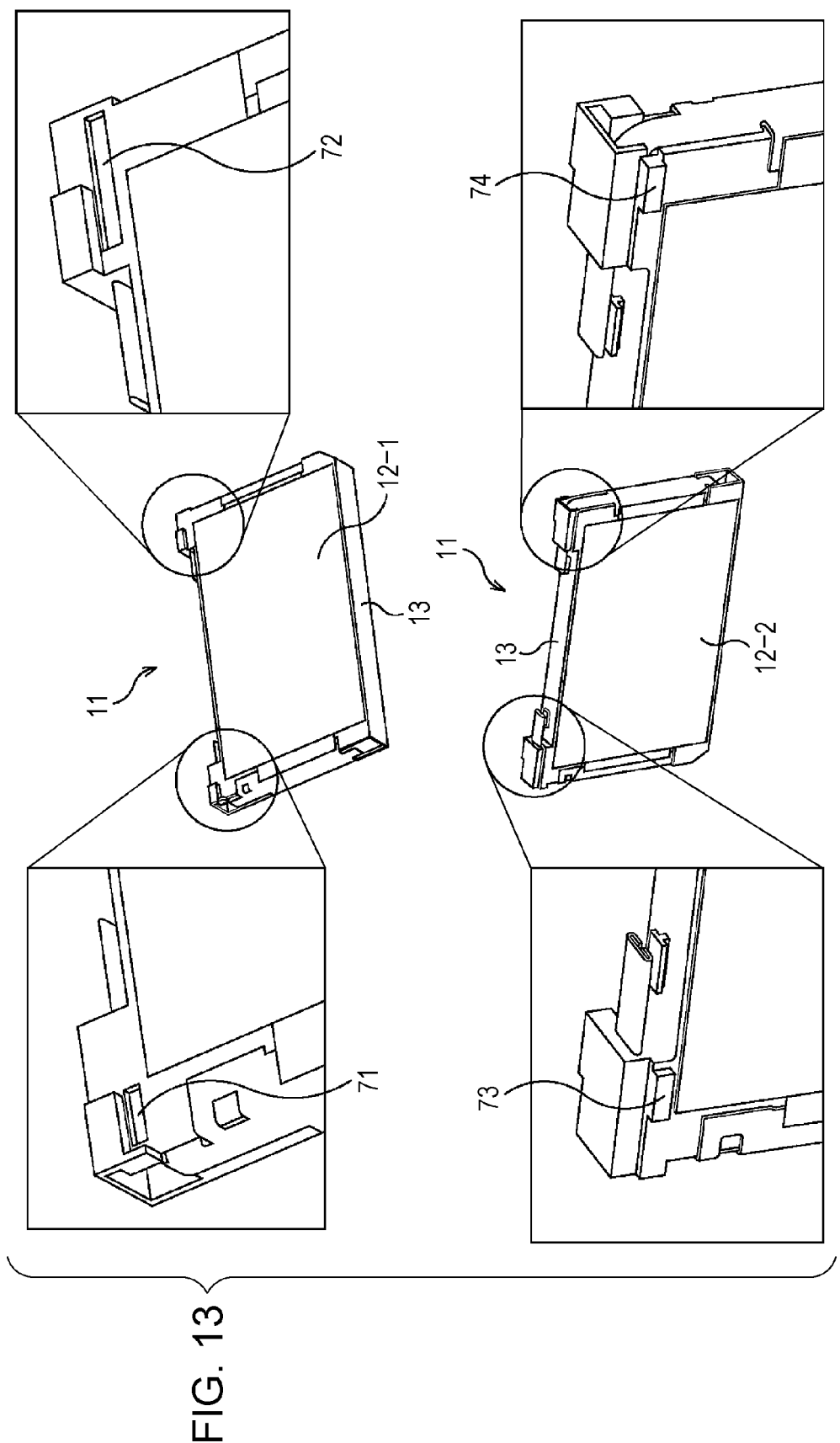
FIG. 13 is a diagram that shows a concave portion and a convex portion formed in the bracket.

FIG. 13 shows a perspective view in which the battery unit 11 is viewed from the front surface side and the rear surface side, and an enlarged view of the upper corner portion of the battery unit 11.

In the upper side of the front surface side of the bracket 13, a concave portion 71 is formed in the left corner portion, and a concave portion 72 is formed in the right corner portion. Furthermore, in the upper side of the rear surface side of the bracket 13, a convex portion 73 is formed in the left corner portion, and a convex portion 74 is formed in the right corner portion. Thus, in the case of forming the parallel block 61, when stacking the battery unit 11 in a plane direction, the convex portion 73 and the convex portion 74 of the other battery unit 11 are inserted into the concave portion 71 and the concave portion 72 of one battery unit 11. Furthermore, a transverse deviation of the concave portion 71 after overlapping by the longitudinal rib is prevented.

Figure 14A:
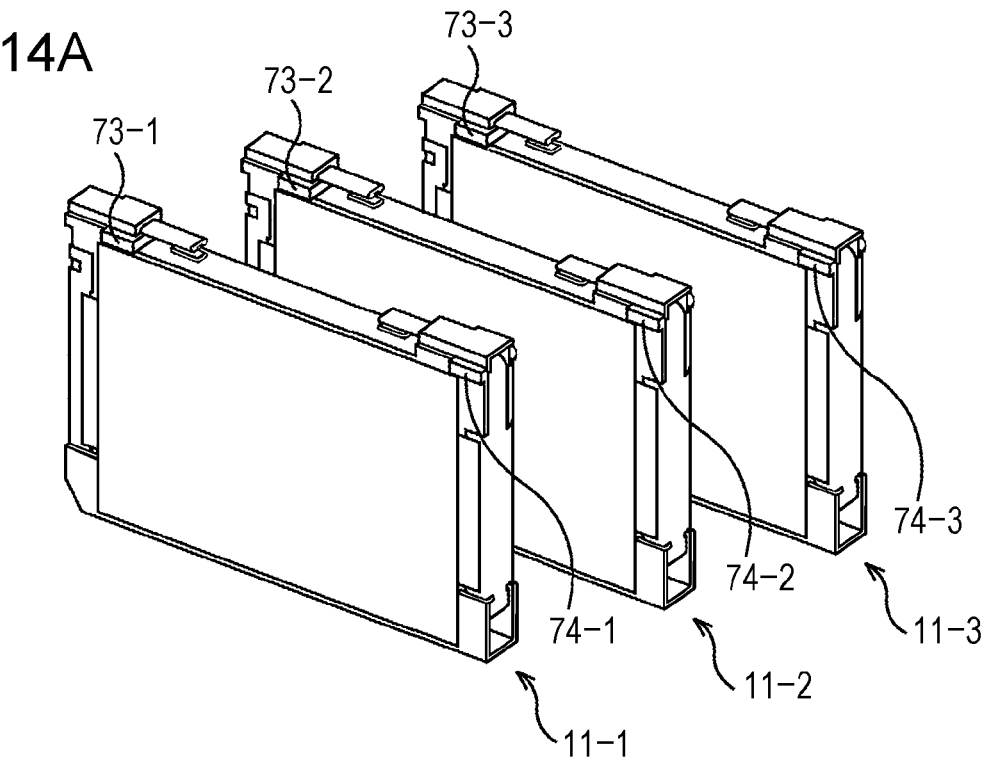
FIGS. 14A and 14B are diagrams that describe a direction upon stacking three battery units.

For example, as shown in FIG. 14A, when the battery units 1-1 to 11-3 are the same direction, the convex portions 73-2 and 74-2 of the battery unit 11-2 are inserted into the concave portions 71-1 and 72-1 (although they are not shown, they are formed on the back side of the convex portions 73-1 and 74-1) of the battery unit 11-1. Similarly, the convex portions 73-3 and 74-3 of the battery unit 11-3 are inserted into the concave portions 71-2 and 72-2 (although they are not shown, they are formed on the back side of the convex portions 73-2 and 74-2) of the battery unit 11-2.

In this manner, in the case where the battery units 11-1 to 11-3 are in the same direction, upon stacking them in the plane direction, since the respective concave portions 71 and 72 are engaged with the convex portions 73 and 74, it is possible to configure the parallel block 61 such that the transverse deviation is not generated in the battery units 11-1 to 11-3.

Figure 14B:
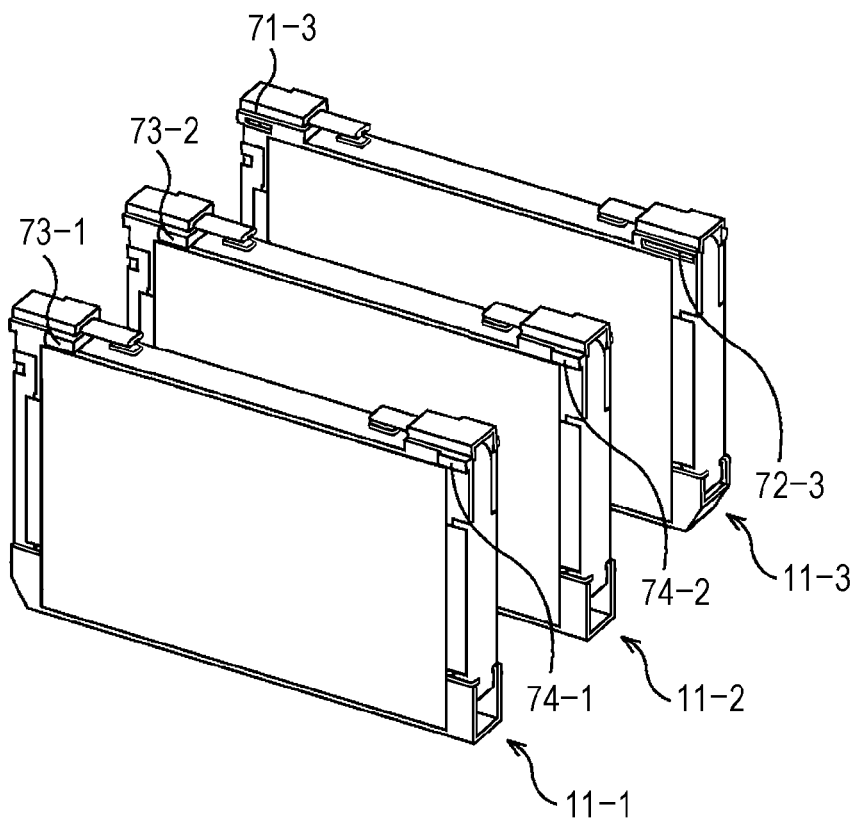

On the contrary, as shown in FIG. 14B, in a case where the direction of the battery unit 11-3 is different, the concave portions 71-3 and 72-3 of the battery unit 11-3 face the concave portions 71-2 and 72-2 (although they are not shown, they are formed on the back side of the convex portions 73-2 and 74-2) of the battery unit 11-2. Thus, even when the battery units are stacked in the plane direction in this state, since the battery units 11-2 and 11-3 are not engaged with each other and are not rigidly fixed to each other, the battery unit 11-3 transversely slides with respect to the battery unit 11-2.

Thus, when the direction of the battery unit 11-3 is different, the battery blocks are not assembled as the parallel block 61, and the terminals being connected in the state of the wrong direction is avoided.

Furthermore, FIG. 15 shows an example of the case where the parallel block 61 is inserted into the module case 52 in a correct direction.

As shown in the left side of FIG. 15, when inserting the parallel block 61 in a correct direction, as shown in a right enlarged view of FIG. 15, the convex portion 73 of one bracket 13 is parallel to the convex portion 74 of the other bracket 13 by the parallel blocks 61 adjacent to each other. In this manner, when the direction of the parallel block 61 is correct, the parallel block 61 is inserted into the module case 52 so that the convex portion 73 does not interfere with the convex portion 74.

Figure 16:
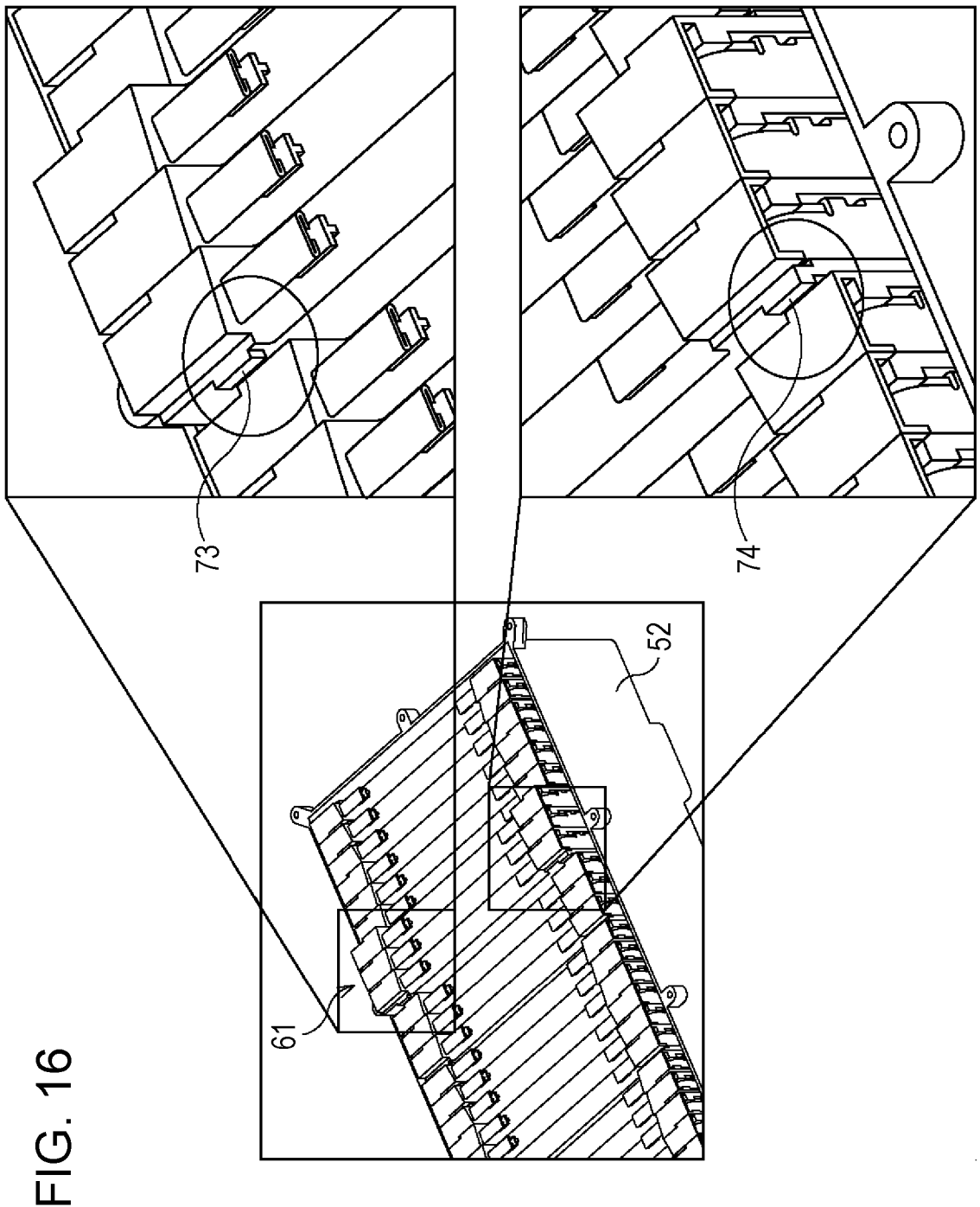
FIG. 16 is a diagram that shows an example of the case where the parallel block is inserted into a module case in an incorrect direction.

Meanwhile, FIG. 16 shows an example of the case where the parallel block 61 is inserted into the module case 52 in the wrong direction.

As shown in the left side of FIG. 16, when inserting the parallel block 61 in the wrong direction, as shown in a right enlarged view of FIG. 16, the convex portions 73 and 74 of the bracket 13 of the parallel block 61 to be inserted come into contact with the upper surface of the adjacent battery unit 11. As a result, the parallel block 61 of the wrong direction being inserted is prevented.

In this manner, in the battery unit 11, the concave portions 71 and 72 and the convex portions 73 and 74 formed in the bracket 13 are configured so as to have both of a function of avoiding the battery cells 12 being combined with each other in the different direction upon stacking the battery cells 12 in the plane direction, and a function of avoiding the parallel block 61 being inserted in the different direction when storing the parallel block 61 in the module case 52 from the upper direction.

In addition, in the battery unit 11, in addition to the insertion prevention in the wrong direction using the chamfered region 62 as described with reference to FIGS. 11A, 11B, and 12, the insertion in the wrong direction is prevented by the use of the convex portions 73 and 74 formed in the bracket 13. In this manner, by taking a plurality of prevention measures, the terminals of the parallel blocks 61 being erroneously connected to each other is prevented, whereby the battery unit 11 can be further safely used.

Figure 17:
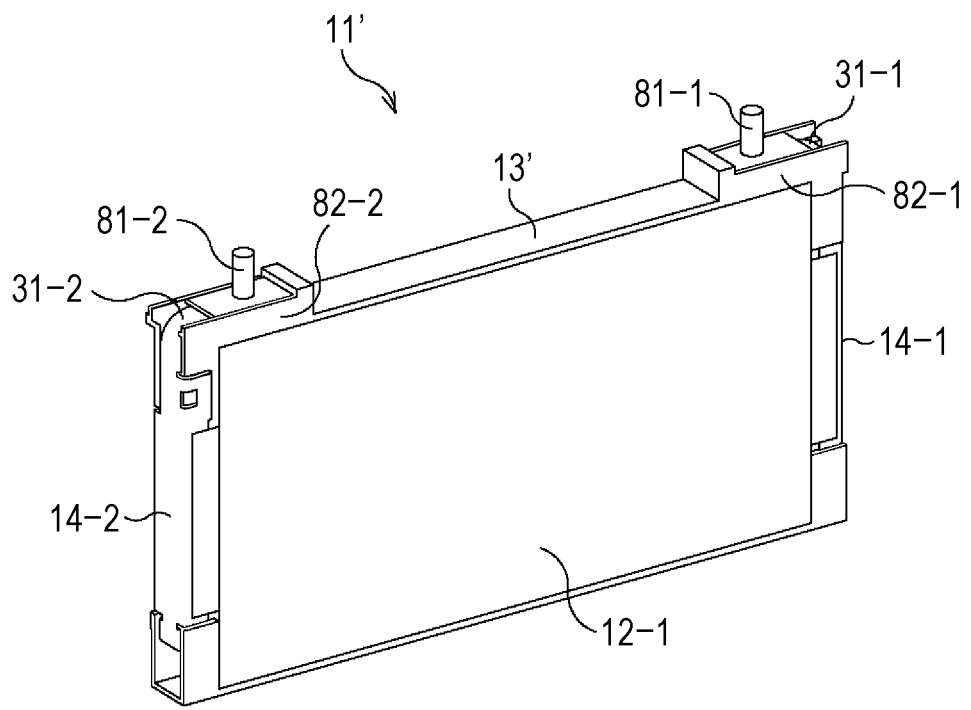
FIG. 17 is a perspective view that shows a modified example of a battery unit of a first embodiment.

Next, FIG. 17 is a perspective view that shows a modified example of a battery unit of a first embodiment.

A battery unit 11' shown in FIG. 17 has two battery cells 12-1 and 12-2 similar to the battery unit 11 of FIG. 1.

In the battery unit 11', an output terminal 81-1 is electrically connected to the upper surface of the terminal 31-1 of the bus bar 14-1, and an output terminal 81-2 is electrically connected to the upper surface of the terminal 31-2 of the bus bar 14-2. The output terminals 81-1 and 81-2 are used in connecting the battery unit 11' with an external device by an electric cable or the like and outputs the electric power accumulated in the battery unit 11' to the external device. For example, the output terminals 81-1 and 81-2 are rod-like members formed with screw grooves, and can fix an electric cable with an O type crimping terminal mounted thereon by the use of a nut.

Furthermore, in the battery unit 11', wall portions 82-1 and 82-2 are formed near both ends of the upper surface of the bracket 13'. The wall portion 82-1 has an approximate U shape that is opened in a right side surface direction of the bracket 13' when viewed from the upside, and is formed so as to surround the terminal 31-1 of the bus bar 14-1 from three sides in the state in which the bus bar 14-1 is mounted on the bracket 13'. Similarly, the wall portion 82-2 is also formed so as to surround the terminal 31-2 of the bus bar 14-2 from three sides. By the wall portions 82-1 and 82-2 formed in this manner, the movements of the terminals 31-1 and 31-2 can be restricted.

Next, a configuration will be described in which a cooling case is mounted on the battery unit 11' based on FIG. 18.

Figure 18:
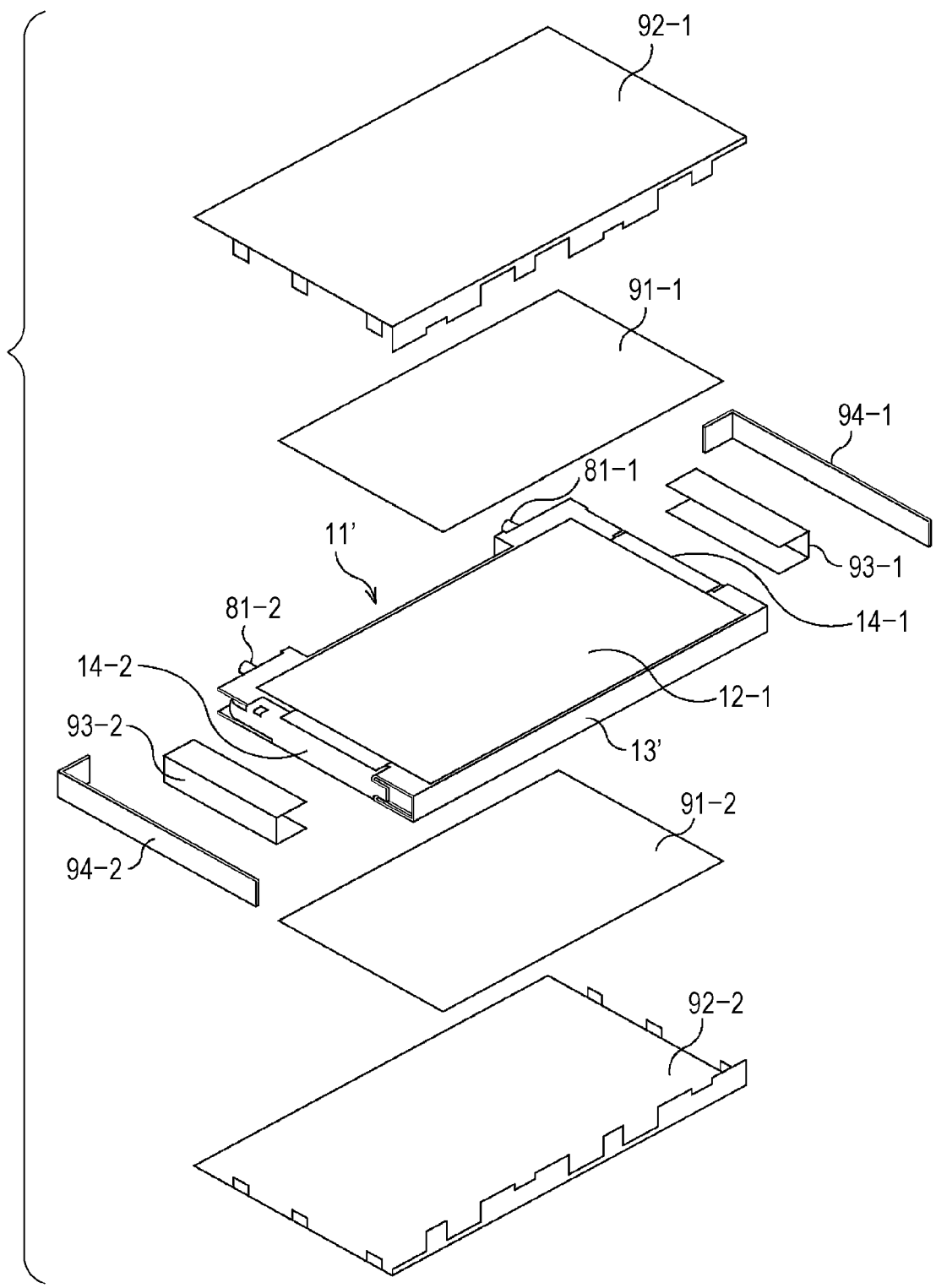
FIG. 18 is a diagram that describes a configuration in which a cooling case is mounted on a battery unit.

As shown in FIG. 18, a cooling case 92-1 is mounted on the front surface side of the battery unit 11' via a heat conduction sheet 91-1, and a cooling case 92-2 is mounted on the rear surface side of the battery unit 11' via a heat conduction sheet 91-2.

The cooling cases 92-1 and 92-2 are formed, for example, by bending an end portion of a thin metal plate such as aluminum. Moreover, the cooling cases 91-1 and 92-2 have shapes that cover the front surface and the rear surface of the battery unit 11' and cover the bottom surface of the battery unit 11' in the state in which the cooling cases 92-1 and 92-2 are combined with each other.

Furthermore, in order that a gap is not generated between the cooling case 92-1 and the battery cell 121, the cooling case 92-1 and the battery cell 121 come into close contact with each other by the heat conduction sheet 91-1. Similarly, the cooling case 92-2 and the battery cell 122 come into close contact with each other by the heat conduction sheet 91-2. As a result, the heat garneted in the battery cells 12-1 and 12-2 is effectively transferred and radiated to the cooling cases 92-1 and 92-2 via the heat conduction sheets 91-1 and 91-2.

Furthermore, when adopting a configuration in which the cooling cases 92-1 and 92-1 are mounted to the battery unit 11', it is necessary that a portion between the cooling cases 92-1 and 92-2 and the bus bar 14-1 (including the electrode terminals 21-1 and 22-2 to be welded to the bus bar 14-1) is insulated and a portion between the cooling cases 92-1 and 92-2 and the bus bar 14-2 (including the electrode terminals 21-1 and 22-2 to be welded to the bus bar 14-2) is insulated. For that reason, the insulation sheets 93-1 and 93-2 having ductility are used.

That is, the insulation sheets 93-1 are bent in an approximate U shape so as to follow the right side surface portion of the battery unit 11' to cover the bus bar 14-1 and are interposed between the bus bar 14-1 and the cooling cases 92-1 and 92-2. Similarly, the insulation sheets 93-2 are bent in an approximate U shape so as to follow the left side surface portion of the battery unit 11' to cover the bus bar 14-2 and are interposed between the bus bar 14-2 and the cooling cases 92-1 and 92-2.

Furthermore, in order to fix the cooling cases 92-1 and 92-2 and the insulation sheets 93-1 and 93-2, side covers 94-1 and 94-2 are mounted on both side surfaces of the battery unit 11'.

The side cover 94-1 has an approximately L shape that covers a part (for example, the terminal 31-1 of the bus bar 14-1 other than the output terminal 81-1) of the right side front surface of the battery unit 11' and the upper surface of the battery unit 11'. Furthermore, the side cover 94-2 also has an approximately L shape. Furthermore, the side covers 94-1 and 94-2 are formed with claw portions for fixing the cooling cases 92-1 and 92-2 as described later with reference to FIGS. 20A and 20B.

Furthermore, as shown in FIG. 18, the cooling cases 92-1 and 92-2 are members having the same shape. Moreover, the cooling cases 92-1 and 92-2 are formed in the shape that covers the bottom front surface of the battery unit 11' in the state in which the cooling cases 92-1 and 92-2 are combined with each other without covering the bottom front surface of the battery unit 11'.

Figure 19A:
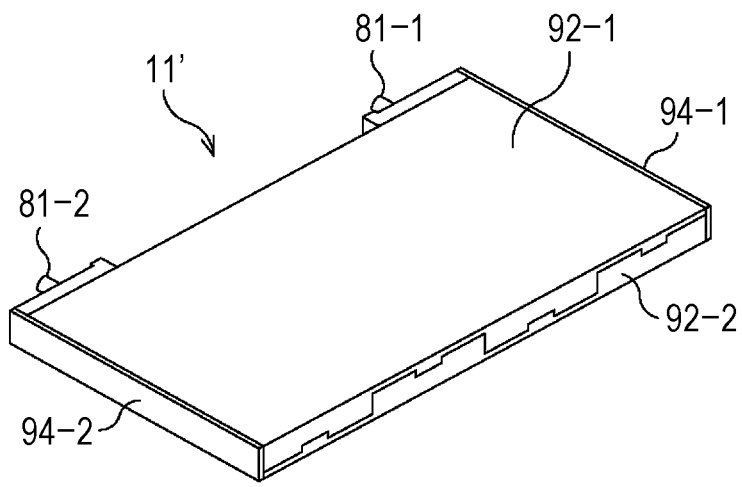
FIGS. 19A and 19B are diagrams that show a battery unit in a state in which the cooling case is mounted.
Figure 19B:
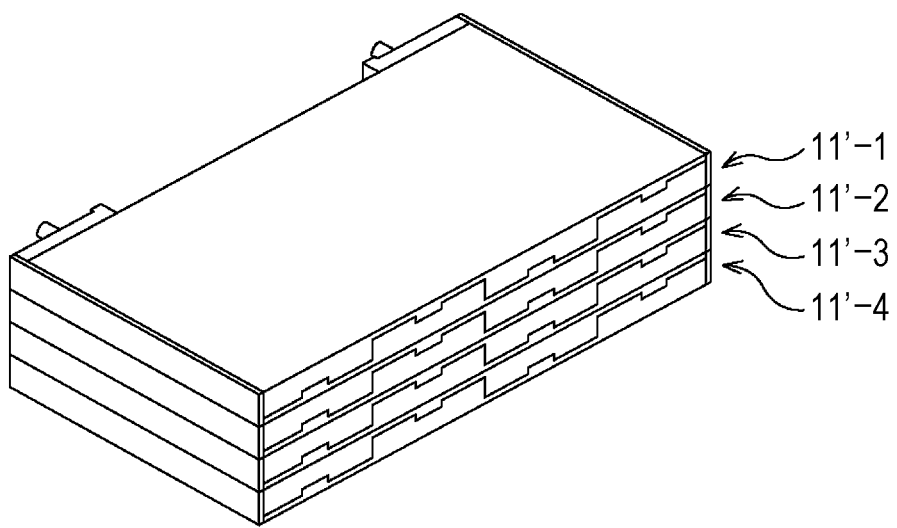

Next, FIGS. 19A and 19B show the battery unit 11' of the state in which the cooling cases 92-1 and 92-2 are mounted. FIG. 19A shows the battery unit 11' of the single body, and FIG. 19B shows the state in which four battery units 11'-1 to 11'-4 are arranged.

Next, as shown in FIG. 19A, the battery unit 11' is in the state in which the front surface side, the rear surface side, and the bottom surface side thereof are covered with the cooling cases 92-1 and 92-2. For example, when the bracket 13' is formed of resin, the heat generated in the battery cells 12-1 and 12-2 is barely radiated from the bottom surface side of the battery unit 11'. On the contrary, the cooling cases 92-1 and 92-2 cover the bottom surface side of the battery unit 11', whereby the heat generated in the battery cells 12-1 and 12-2 is easily radiated from the bottom surface side of the battery unit 11' via the cooling cases 92-1 and 92-2.

Particularly, as shown in FIG. 19B, in the state in which the plurality of battery units 11' are arranged, by cooling the plane formed of the bottom surfaces of the battery units 11'-1 to 11'-4, all of the battery units 11'-1 to 11'-4 can be effectively cooled. For example, by placing the plurality of battery units 11' on a cooling mechanism (not shown), the battery units 11' can be effectively cooled while reducing the volume thereof.

That is, by adopting the thin plate of a material having high thermal conductivity as the cooling cases 92-1 and 92-2, it is possible to suppress that the volume of the battery unit 11' is increased. In addition, by performing the heat radiation from the bottom surface of the battery unit 11' by the cooling cases 92-1 and 92-2, the cooling efficiency can be improved.

Next, a structure will be described which fixes the cooling cases 92-1 and 92-2 with reference to FIGS. 20A and 20B.

Figure 20A:
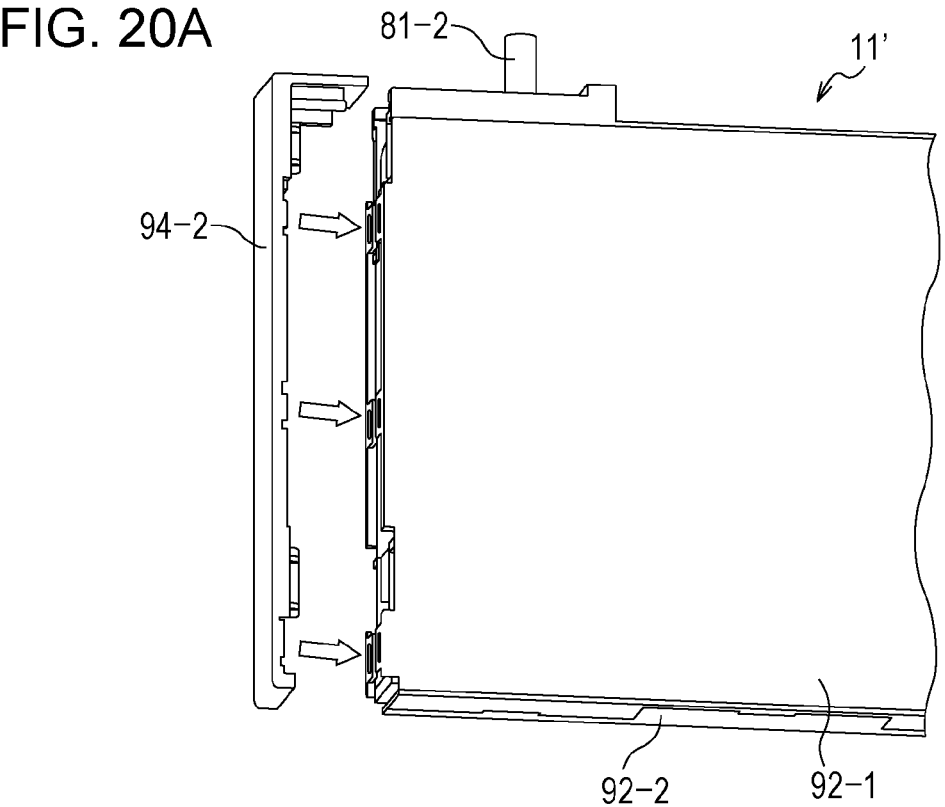
FIGS. 20A and 20B are diagrams that describe a structure that fixes the cooling case.

FIG. 20A shows a left side portion of the battery unit 11' in the state in which the cooling cases 92-1 and 92-2 interposes the battery unit 11' therebetween and before the side cover 94-2 is mounted thereon. Furthermore, FIG. 20B shows an enlarged view of an upper portion of the battery unit 11' shown in FIG. 20A.

In the cooling cases 92-1 and 92-2, claws portions are formed in three places of both side ends thereof, respectively, and the claw portions are bent so as to be disposed on the side surface of the battery unit 11' in the state of being mounted on the battery unit 11'. Moreover, In the claw portions of the cooling cases 92-1 and 92-2, engagement holes are formed, respectively. Furthermore, in the side covers 94-1 and 94-2, claw portions are formed in the places corresponding to the engagement holes formed in the claw portions of the cooling cases 92-1 and 92-2, respectively.

For example, the engagement holes of the cooling cases 92-1 and 92-2 are formed on the tip end side of a white arrow shown in FIG. 20A, and the claw portion of the side cover 94-2 is formed on the proximal end side of the white arrow.

Figure 20B:
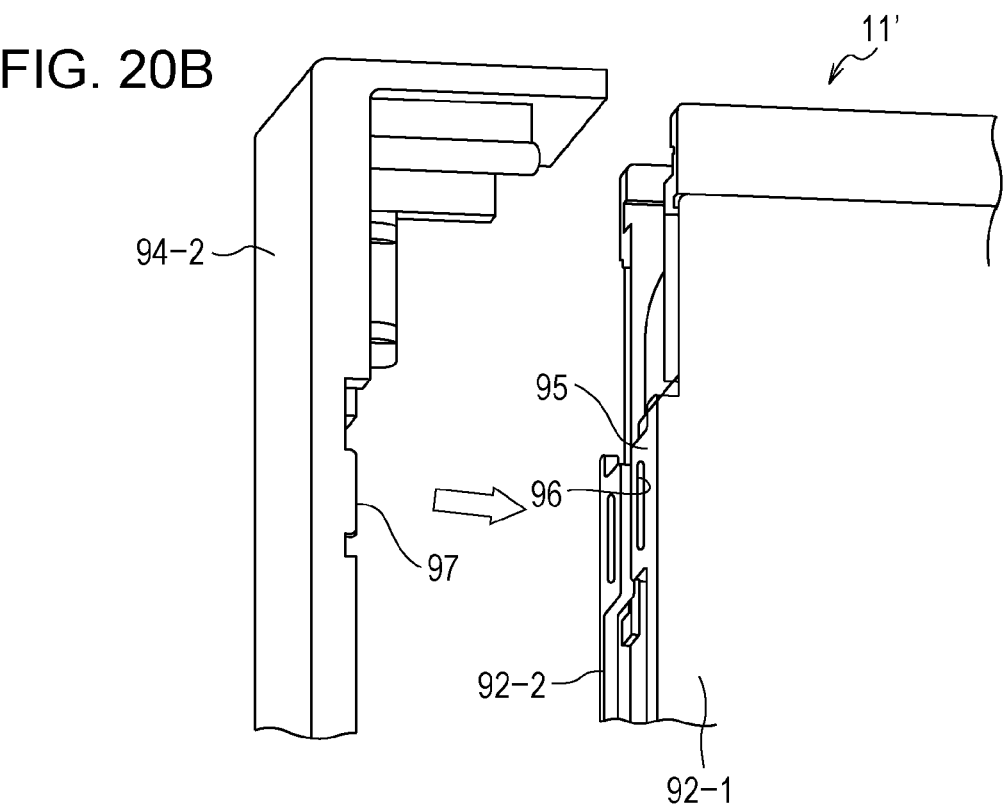

That is, when the side cover 94-2 is mounted on the battery unit 11' from the left surface side of the battery unit 11' toward a direction of the white arrow, as shown in FIG. 20B, a claw portion 97 formed in the side cover 94-2 is inserted is inserted into an engagement hole 96 of a claw portion 95 formed in the cooling case 92-1, and the claw portion 97 and the engagement hole 96 are engaged with each other. Similarly, although it is not shown, another claw portion of the side cover 94-2 is engaged with another engagement hole of the cooling cases 92-1 and 92-2. Furthermore, in the right side portion of the battery unit 11', the claw portion of the side cover 94-1 is engaged with the engagement holes of the cooling cases 92-1 and 92-2.

As a result, the side covers 94-1 and 94-2 can reliably fix the cooling cases 92-1 and 92-2 to the battery unit 11'.

Furthermore, by adopting a structure in which the cooling cases 92-1 and 92-2 are mounted so as to interpose the battery unit 11' therebetween, for example, it is possible to cope with the expansion of the battery cell 12. That is, it is possible to adopt a configuration in which the side covers 94-1 and 94-2 are slightly moved so as to be opened in the width direction according to the expansion of the battery cell 12.

As described with reference to FIGS. 4A and 4B, the battery unit 11 has a structure in which the bracket 13 protects the battery cells 12-1 and 12-2. Similarly, the battery unit 11' has a structure in which the battery cells 12-1 and 12-2 are protected, and the bracket 13' and the side covers 94-1 and 94-2 protect the end surfaces of the cooling cases 92-1 and 92-2.

A protective structure in the battery unit 11' will be described with reference to FIGS. 21A and 21B.

Figure 21A:
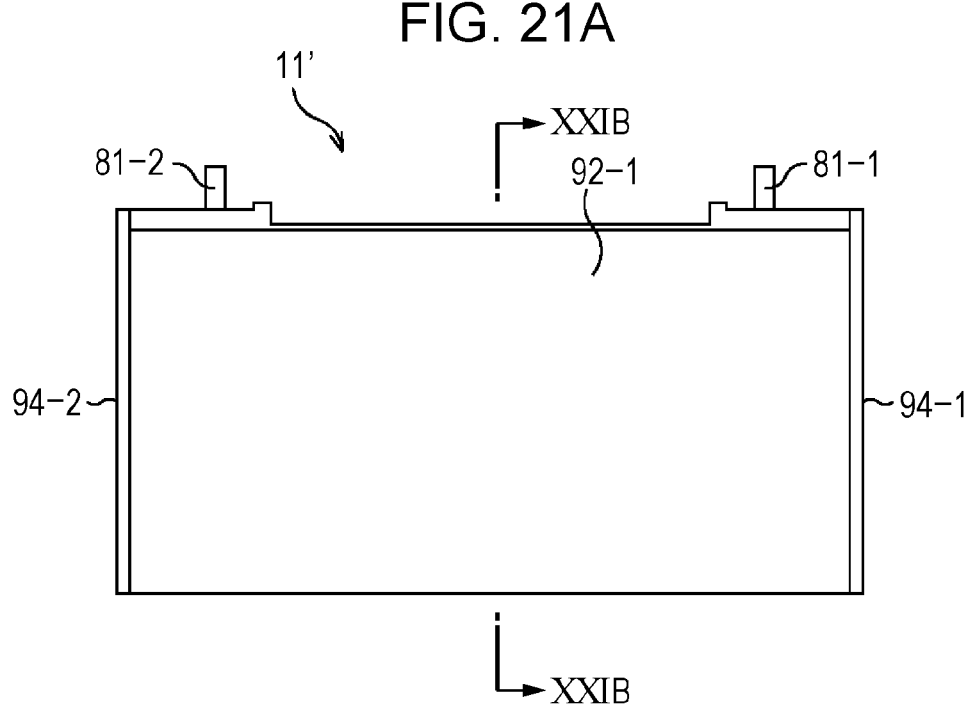
FIGS. 21A and 21B are diagrams that describe a protective structure in the battery unit.
Figure 21B:
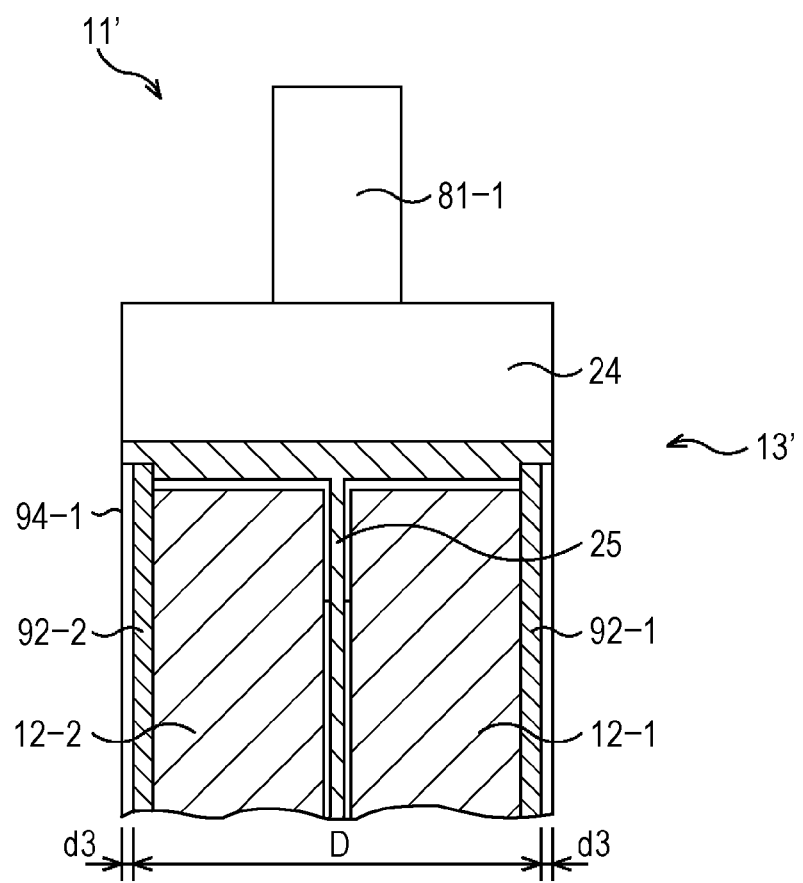

FIG. 21A shows a front view of the battery unit 11', and FIG. 21B shows an enlarged view of an upper end portion in the cross-sectional view in the direction of the arrow XXIB-XXIB shown in FIG. 21A.

As shown in FIG. 21B, the bracket 13' is formed so that the battery cells 12-1 and 12-2 are mounted and the outer peripheral wall 24 of the upper surface side is raised on both sides by a gap d3 further than the dimension D in the thickness direction in the state in which the cooling cases 92-1 and 92-2 are mounted. For example, the depth from the surface of the outer peripheral wall 24 of the upper surface side of the bracket 13' to the rib portion 25 is designed so as to become a dimension (furthermore, in the case of using the double-sided tape 16 (FIG. 2), a dimension considering the thickness of the double-sided tape 16) in which the gap d3 is added to the thickness dimensions of the battery cell 121 and the cooling case 92-1. Similarly, the depth from the back surface of the outer peripheral wall 24 of the upper surface side of the bracket 13' to the rib portion 25 is also designed so as to be a dimension in which the gap d3 is added to the thickness dimensions of the battery cell 122 and the cooling case 92-2.

Furthermore, the thickness direction (thickness direction when viewed as a whole of the battery unit 11') of the side covers 94-1 and 94-2 is also designed so as to be a dimension in which the gap d3 is added to both side surfaces of the dimension D mentioned above like the outer peripheral wall 24 of the upper surface side of the bracket 13'.

In this manner, by designing the dimension of the outer peripheral wall 24 of the upper surface side of the bracket 13' and the dimensions the side covers 94-1 and 94-2, the upper end surfaces and the left and right end surfaces of the cooling cases 92-1 and 92-2 can be covered with the bracket 13' and the side covers 94-1 and 94-2. As a result, it is possible to protect the end surfaces of the cooling cases 92-1 and 92-2 from stress or shock from the outside.

Furthermore, since the whole outer peripheral surfaces of the battery cells 12-1 and 12-2 can be surrounded by the bracket 13' and the cooling cases 92-1 and 92-2, the battery cells 12-1 and 12-2 can be reliably protected from the outside.

Figure 22:
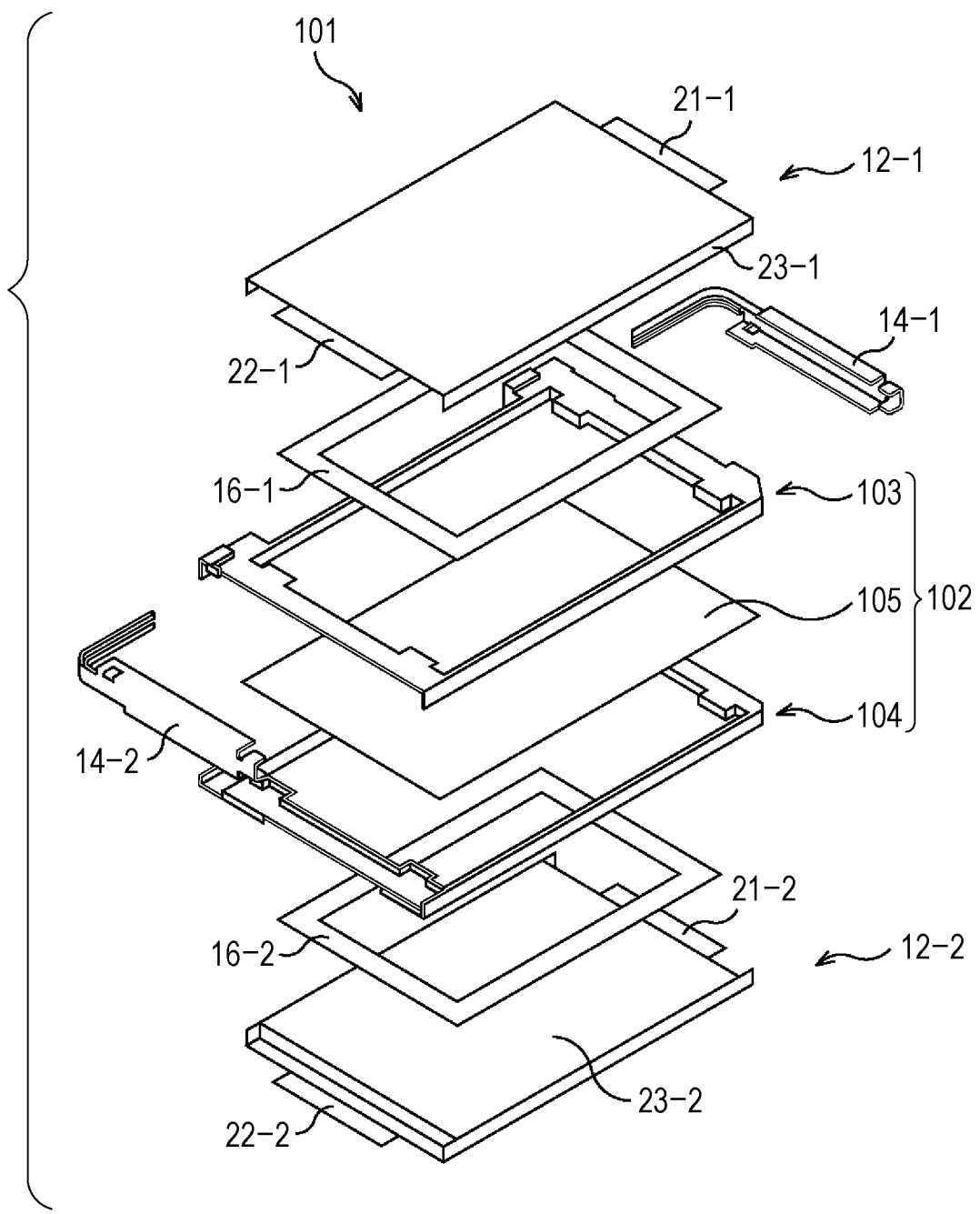
FIG. 22 is an exploded diagram that shows a configuration example of a second embodiment of a battery unit to which an embodiment is applied.

Next, FIG. 22 is an exploded view that shows a configuration example of a second embodiment to which an embodiment is applied.

A battery unit 101 is common to the battery unit 11 of FIG. 2 in that the battery cells 12-1 and 12-2, bus bars 14-1 and 14-2, and the double-sided tapes 16-1 and 16-2 are included. Meanwhile, the battery unit 101 is different from the battery unit 11 in that a bracket 102 having a configuration different form that of the bracket 13 is included.

The bracket 102 of the battery unit 11 is integrally configured, meanwhile the bracket 102 of the battery unit 101 is configured so that the bracket parts 103 and 104 and the aluminum corrugation 105 are combined with each other.

The bracket parts 103 and 104 are formed in a shape in which the rib portion 25 is excluded from the bracket 13 and the bracket 13 is divided into two parts in the center in the thickness direction. By combining the bracket parts 103 and 104, the bracket parts have approximately the same shape as that of the outer peripheral wall 24 of the bracket 13.

Figure 23:
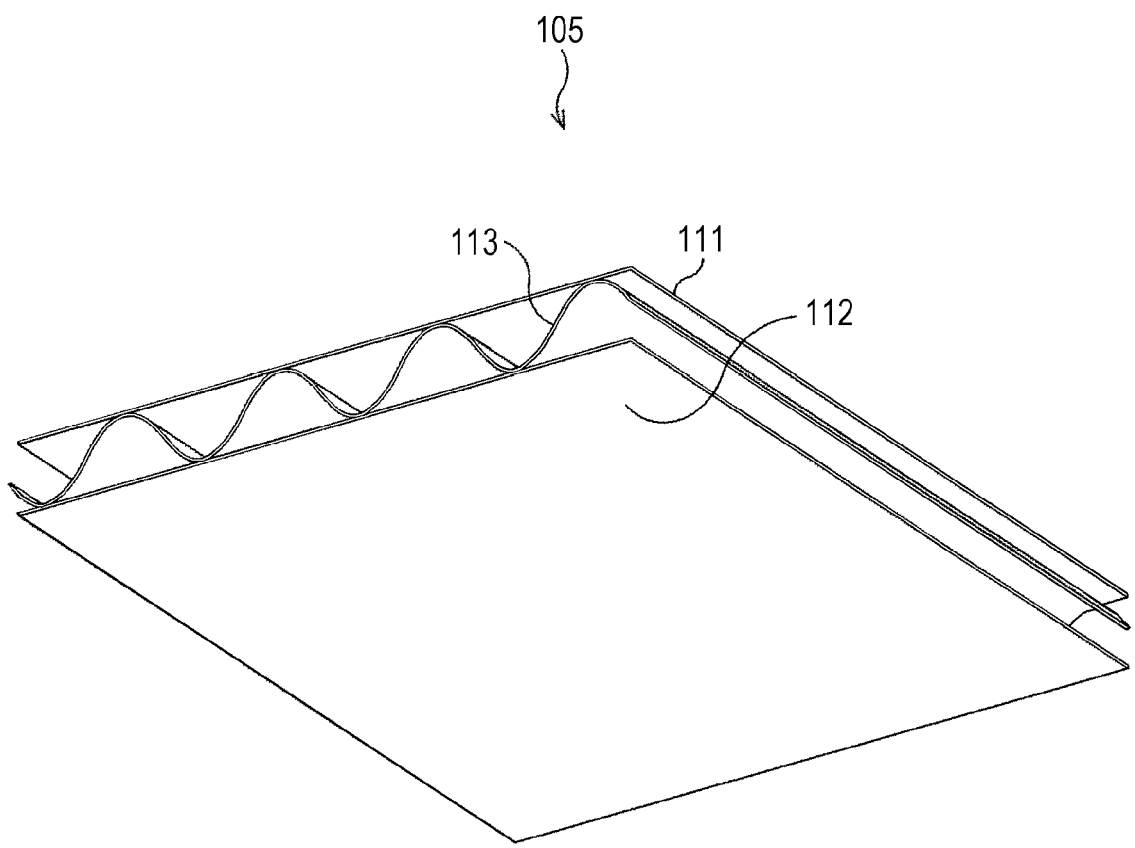
FIG. 23 is a diagram that shows a structure of aluminum corrugation.

The aluminum corrugation 105 is a member that is formed of a thin plate of aluminum, has the same thickness as that of the rib portion 25 of the bracket 13, and a channel is provided inside thereof through which a refrigerant (for example, air, water or the like) is circulated. That is, as shown in FIG. 23, the aluminum corrugation 105 is configured so that an aluminum wave plate 11-3 is interposed between two aluminum flat plates 111 and 112.

The bracket parts 103 and 104 are combined with each other with the aluminum corrugation 105 configured in this manner interposed therebetween, whereby the bracket 102 having a path, through which the refrigerant is circulated between the battery cells 12-1 and 12-2, is configured.

Furthermore, in the battery unit 101, a double-sided tape is used which adopts a material (a heat conduction sheet) of high thermal conductivity as the double-sided tapes 16-1 and 16-2. In addition, the double-sided tapes 16-1 and 16-2 can have a shape in which the whole surfaces of the battery cells 12-1 and 12-2 are attached to the aluminum corrugation 105.

Figure 24:
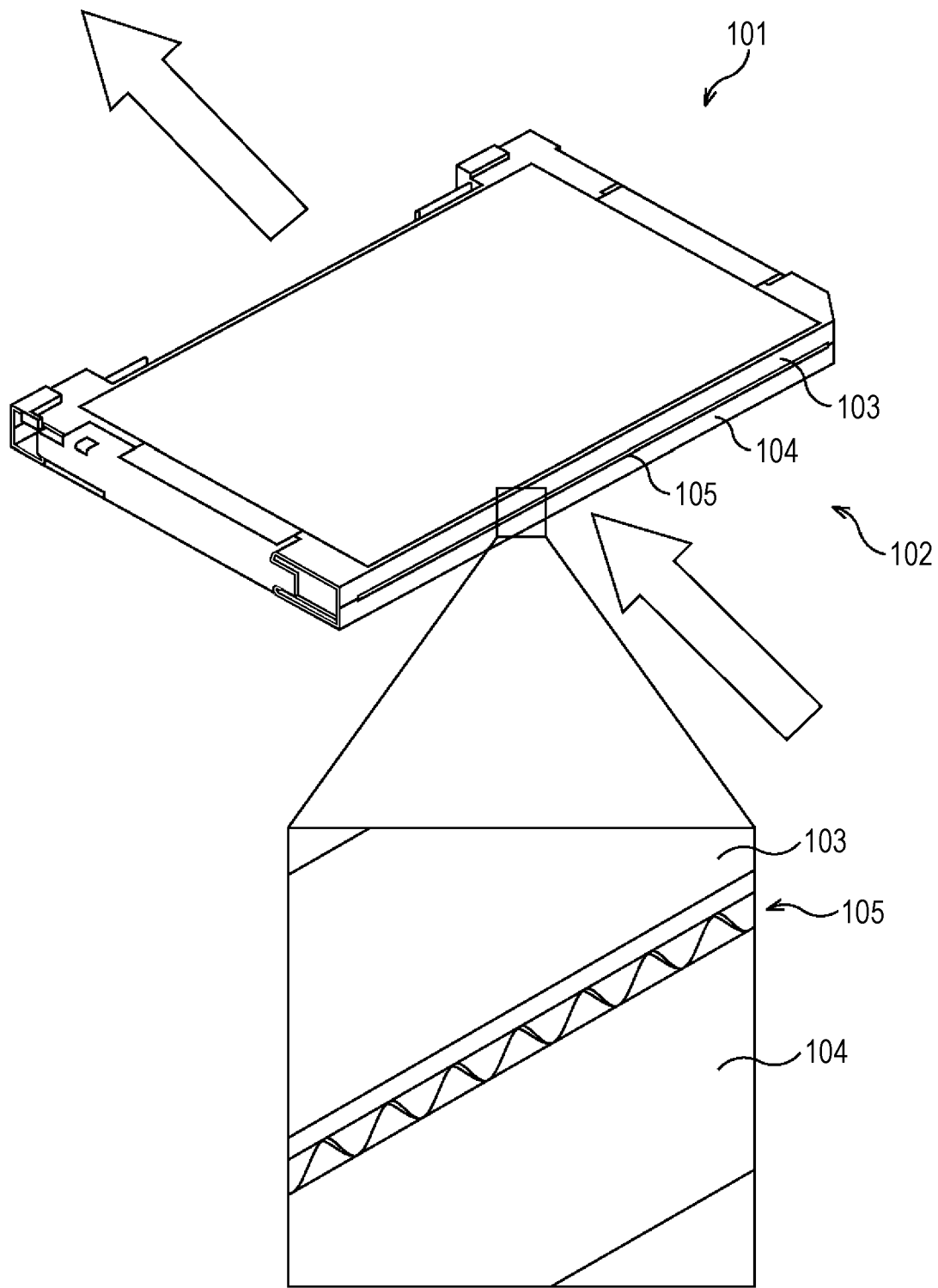
FIG. 24 is a diagram that describes circulation of refrigerant of a battery unit.

Moreover, as shown in FIG. 24, the bracket 102 is configured so that a channel of the aluminum corrugation 105 penetrates through the bottom surface and the upper surface of the battery unit 101. As a result, by circulating the refrigerant from the bottom surface of the battery unit 101 to the upper surface thereof, it is possible to effectively discharge the heat generated in the battery cells 12-1 and 12-2, which come into close contact with the aluminum corrugation 105 via the double-sided tapes 16-1 and 16-2, to the outside.

Furthermore, by setting the thickness of the aluminum corrugation 105 to about the same thickness (for example, about 0.8 mm) as that of the rib portion 25 of the bracket 13, it is possible to configure the battery unit 101 without increasing the volume from the battery unit 11. That is, it is possible to realize the battery unit 101 having the improved cooling performance while reducing the whole volume.

In addition, if a material has high thermal conductivity and can circulate the refrigerant, the aluminum corrugation 105 is not limited to the configuration as shown in FIG. 23. Furthermore, the bracket 102 may be integrally formed by performing an insert molding of the aluminum corrugation 105 other than the configuration in which the aluminum corrugation 105 is interposed between the bracket parts 103 and 104.

Next, a configuration will be described in which the terminals 31 of the respective battery units 11 are connected to each other when combining the plurality of battery units 11 to configure the battery portion 54 (see FIG. 9) with reference to FIGS. 25 to 29B.

Figure 25:
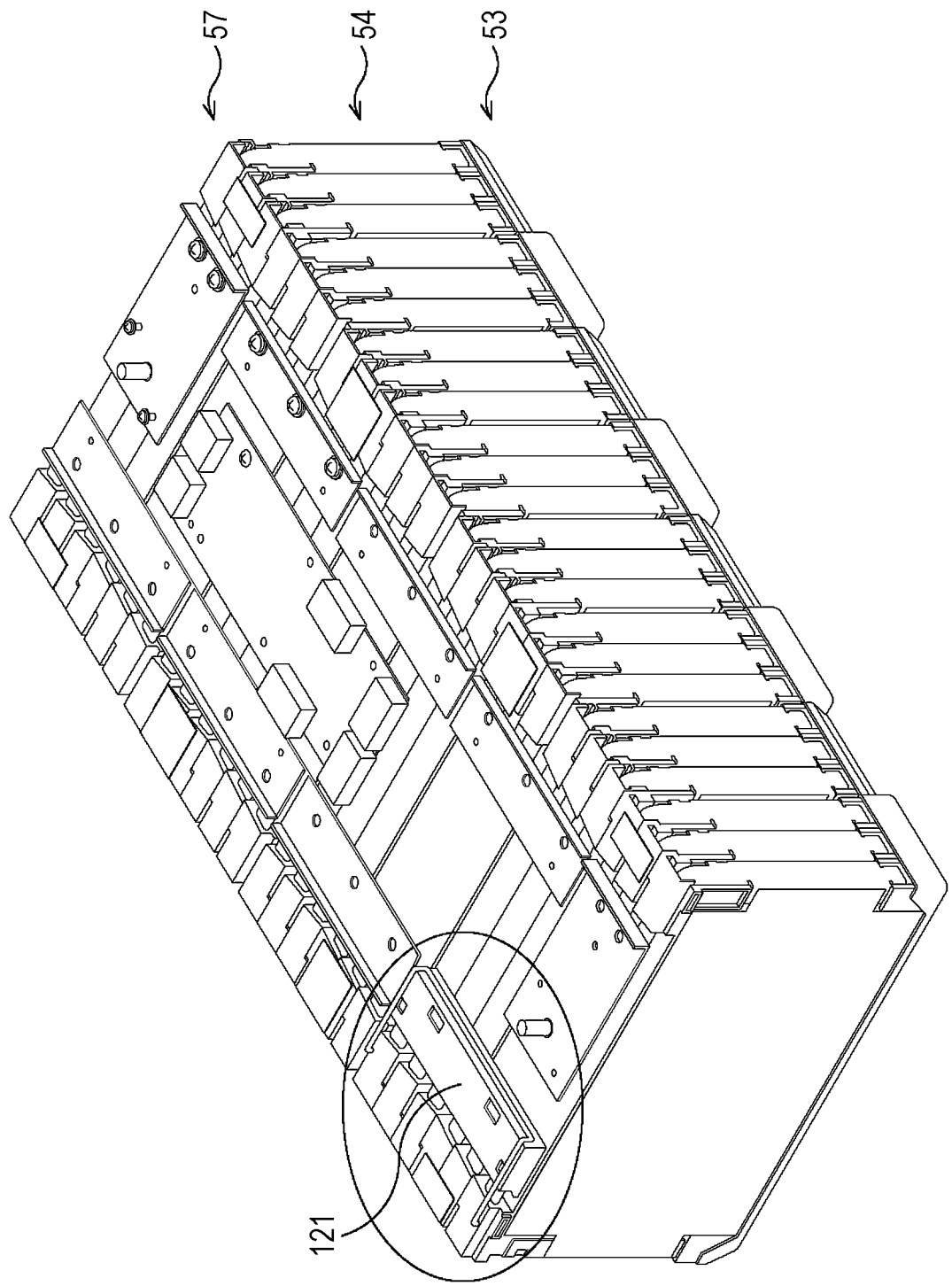
FIG. 25 is a diagram that describes a configuration that connects terminals of a plurality of battery units.

FIG. 25 shows the state in which the rubber sheet portion 53, the battery portion 54, and the electric part portion 57 are combined with each other in the configuration of the battery module 51 described based on FIG. 9.

As mentioned above, in the battery portion 54, the parallel block 61 (FIG. 10) with three battery units 11 connected in parallel is connected in series to configure the battery portion 54, and the terminals 31 of six battery units 11 are electrically connected.

As a method of electrically connecting the plurality of terminals 31, for example, there is a method of interposing the plurality of terminals 31 by the metal plate material in the vertical direction and fixing the metal plate material by the use of a screw. On the contrary, in the battery module 51, a method is adopted which electrically connects the plurality of terminals 31 by the use of a connector 121 having a structure that is capable of being mounted on the plurality of terminals 31 by one touch.

Figure 26A:
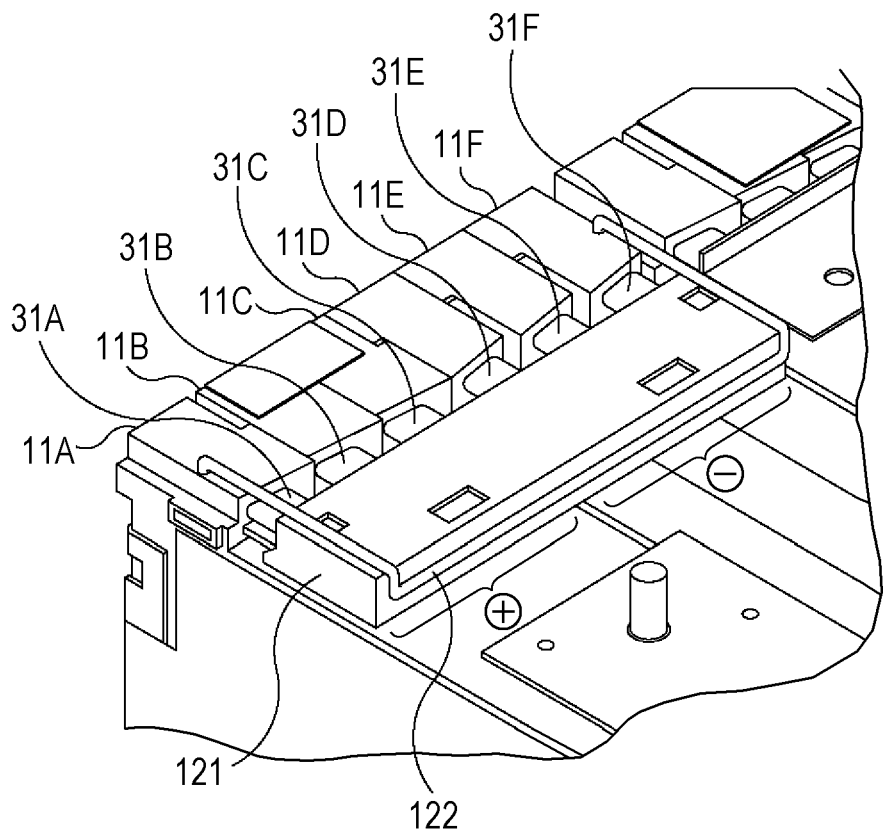
FIGS. 26A and 26B are diagrams that show a connection configuration of a terminal and a connector.
Figure 26B:
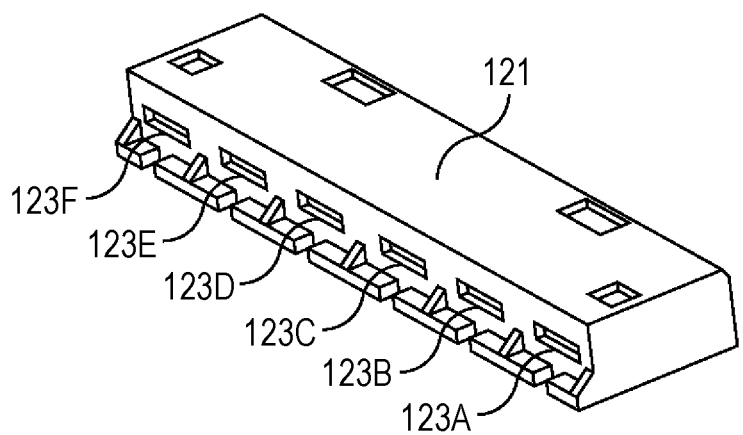

FIG. 26A shows an enlarged view of an elliptical portion shown in FIG. 25, and FIG. 26B shows a perspective view of the connector 121.

FIG. 26A shows a portion in which six battery units 11A to 11F are connected by the connector 121, and a connection configuration is provided in which the terminals 31A to 31C of the positive side of the battery units 11A to 11C are connected in parallel, the terminals 31D to 31F of the negative side of the battery units 11D to 11F are connected in parallel, the terminals 31A to 31C of the positive side of the battery units 11A to 11C and the terminals 31D to 31F of the negative side of the battery units 11D to 11F are connected in series.

As shown in FIG. 26B, in the connector 121, the insertion portions 123A to 123F are formed in the places corresponding to the terminals 31A to 31F, and the terminals 31A to 31F are inserted into the insertion portions 123A to 123F, whereby the terminals 31A to 31F are electrically connected to each other in the inner portion of the connector 121.

Furthermore, as shown in FIG. 26A, a stopper bar 122 for locking the connector 121 is provided. Both ends of the stopper bar 122 are able to be fixed to the battery units 11A and 11F, whereby a worker pushes the connector 121 in a direction in which the terminals 31A to 31F are inserted into the insertion portions 123A to 123F of the connector 121, and then locks the rear surface (a surface of an opposite side of the surface formed with the insertion portions 123A to 123F) of the connector 121 by the stopper bar 122, thereby mounting the connector 121.

In this manner, it is possible to concurrently realize the parallel connection of the terminals 31A to 31C, the parallel connection of the terminals 31D to 31F, and the series connection of the terminals 31A to 31C with the terminals 31D to 31F by the connector 121.

Figure 27A:
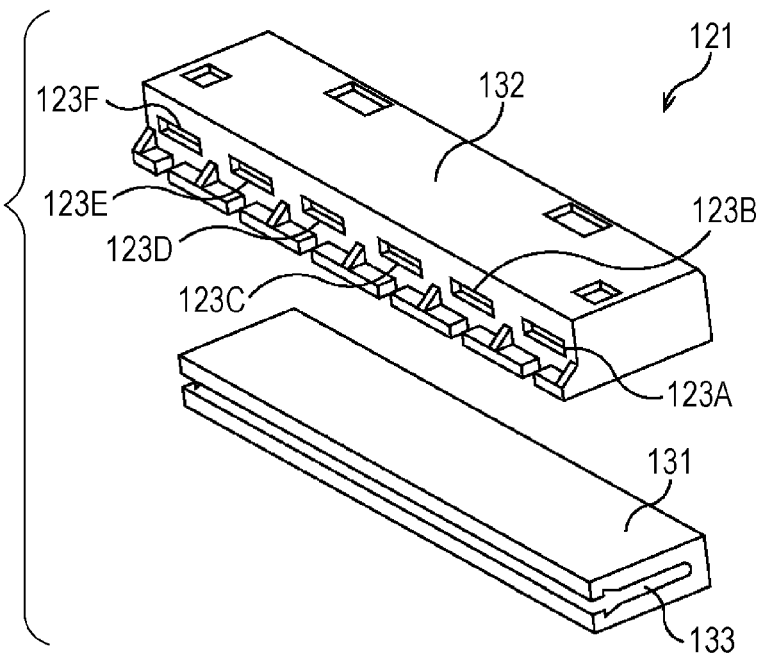
FIGS. 27A and 27B are perspective views of the connector.
Figure 27B:
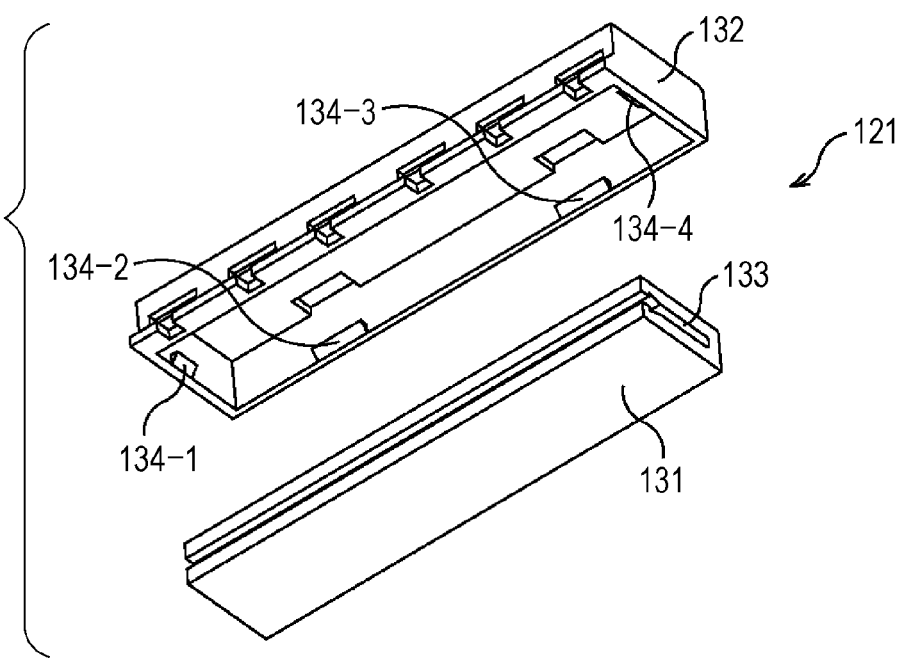

Furthermore, as shown in FIGS. 27A and 27B, the connector 121 is configured by assembling the metallic connector 131 and the resin case 132. FIG. 27A shows a perspective view in which the connector 121 is viewed from the upper surface side, and FIG. 27B shows a perspective view in which the connector 121 is viewed from the bottom surface side.

In the metallic connector 131, a groove portion 133 depending on the thickness of the terminal 31 is formed, and a plurality of contact portions (not shown) is provided on the upper and lower surfaces of the groove portion 133. The plurality of contact portions of the metallic connector 131 is disposed so as to be able to come into contact with one terminal 31 at a plurality of points, and the metallic connector 131 is electrically connected to the terminal 31 by so-called multipoint contact.

The resin case 132 is a case that houses the metallic connector 131 so as to cover a portion other than the bottom surface of the metallic connector 131, and the insertion portions 123A to 123F are formed at the height corresponding to the groove portion 133 of the metallic connector 131. Furthermore, claw portions 134-1 to 134-4 for holding the stored metallic connector 131 are formed in the vicinity of the bottom surface of the inner peripheral surface of the resin case 132.

In this manner, by the configuration in which the metallic connector 131 is stored in the resin case 132, insulation property relative to the outside is excellent and the stability can be further improved.

Furthermore, the notch portions are formed for each of insertion portions 123A to 123F, whereby the connector 121 can be further strongly mounted on the bracket 13 by the use of the notch portions.

Figure 28A:
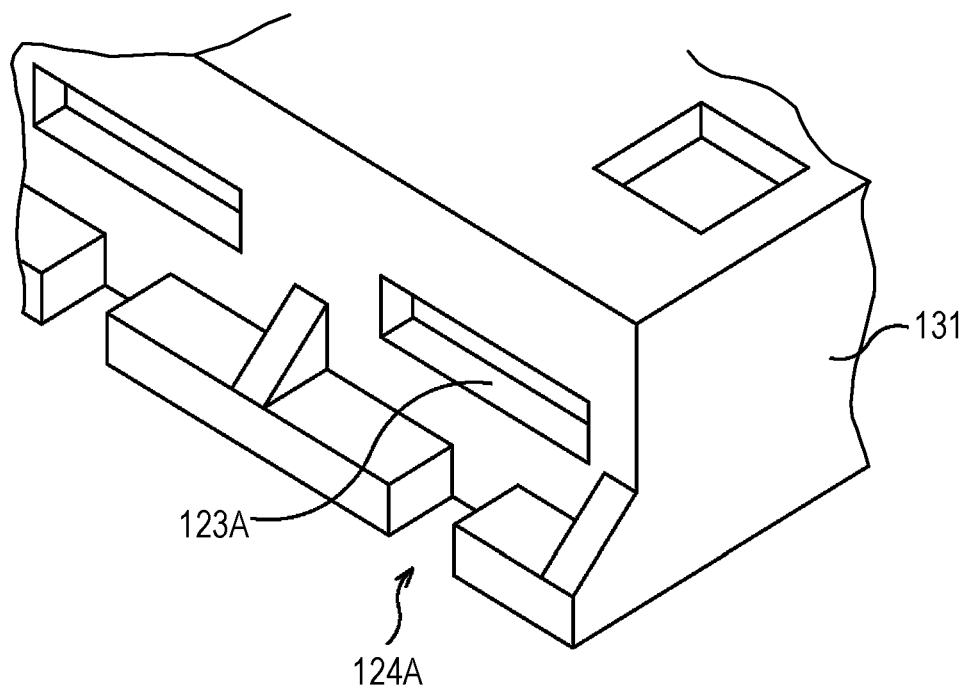
FIGS. 28A and 28B are enlarged views of the terminal and the connector.
Figure 28B:
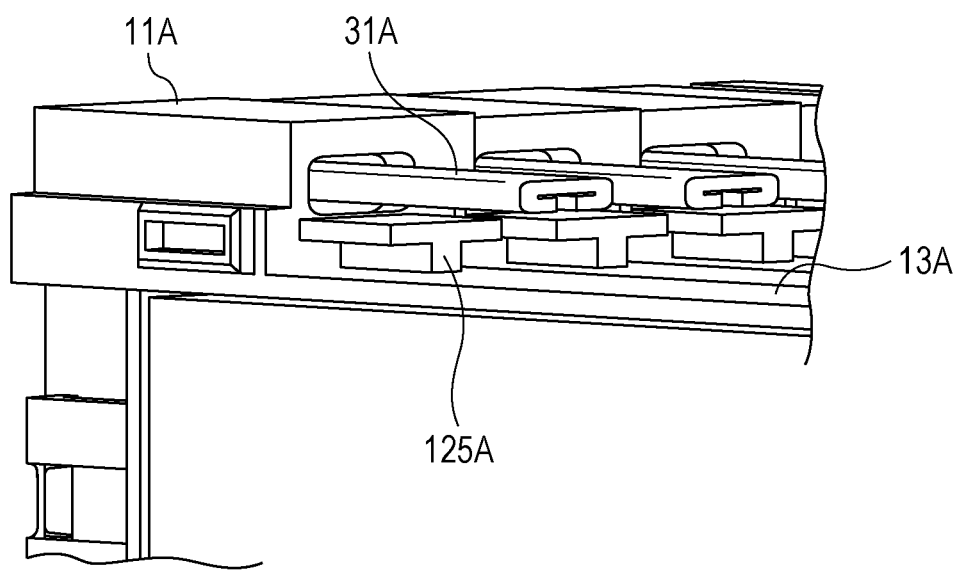

Herein, FIG. 28A shows the vicinity of the insertion portion 123A of the connector 121 and FIG. 28B shows the vicinity of the terminal 31A.

As shown in FIG. 28A, the cutout portion 124A is formed on the lower side of the insertion portion 123A. Furthermore, as shown in FIG. 28B, a T-shaped rib 125A is formed on the lower portion of the terminal 31A of the upper surface of the bracket 13A.

Figure 29A:
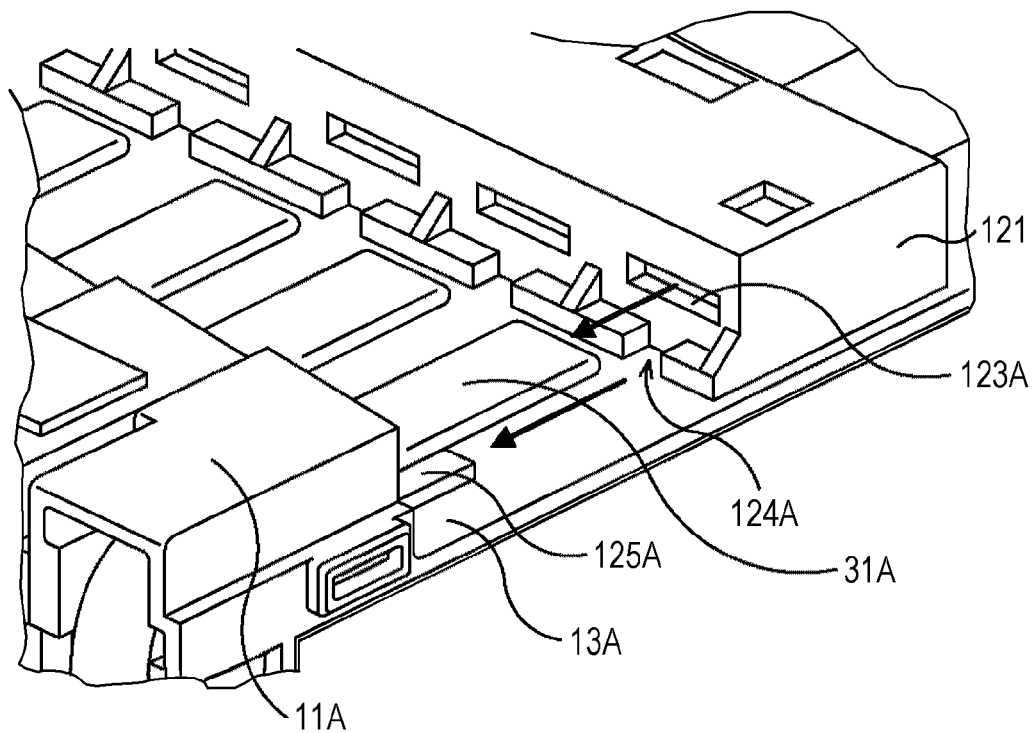
FIGS. 29A and 29B are diagrams that describe the fixing of the connector.
Figure 29B:
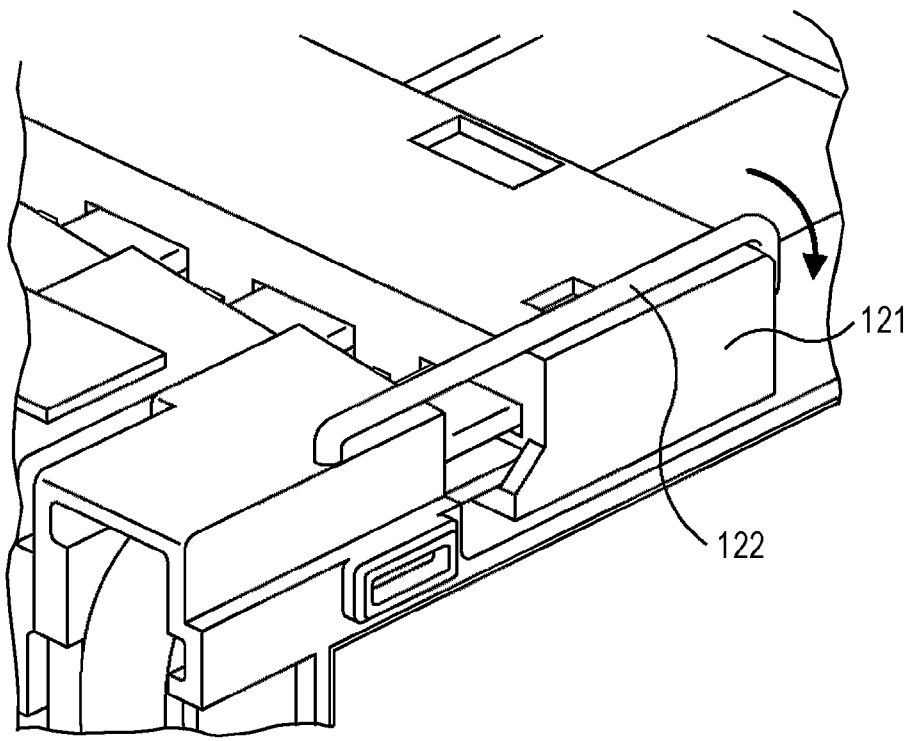

Moreover, as shown in FIG. 29A, by causing the connector 121 to slide toward the terminals 31A to 31F (along the shown arrow), the terminal 31A is inserted into the insertion portion 123A and the T-shaped rib 125A is inserted into the cutout portion 124A. In this manner, the T-shaped rib 125A is inserted into the cutout portion 124A, whereby the connector 121 is fixed in a direction perpendicular to the shown arrow, and then the connector 121 is fixed in the direction of the shown arrow by the stopper bar 122. As a result, the connector 121 is reliably fixed to the brackets 13A to 13F, whereby the connector 121 can include further high vibration resistance.

In this manner, by the configuration in which the terminals 31A to 31F are connected using the connector 121 by one touch, for example, as compared to a configuration that uses a metal plate material, a screw or the like, the production costs necessary for the assembling can be reduced. Furthermore, by adopting the multipoint contact in the metallic connector 131, a stable contact resistance (conductivity) can be obtained.

In addition, embodiments are not limited to the embodiments mentioned above, and various changes can be made within the scope of not departing from the gist.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A battery unit comprising:
a battery cell that charges and discharges electric power, the battery cell having a cell main body comprising opposing first and second planar surfaces, and a pair of plane-shaped electrode terminals both about coplanar with the first planar surface of the cell main body;
a bracket that has an outer peripheral wall portion surrounding an outer peripheral side surface of the battery cell, and a support body which is provided inside the outer peripheral wall portion and supports the battery cell, the support body comprising (1) a rib portion extending inward from an inner side surface of the outer peripheral wall portion, and (2) a plate-shaped member in which a distribution channel of refrigerant is provided inside thereof, wherein the distribution channel extends parallel to at least one of the first and second planar surfaces of the cell main body, and wherein two battery cells are inserted from a front surface side and a back surface side of the bracket into the outer peripheral wall portion and are mounted on both side surfaces of the support body, a respective pair of electrode terminals of the two battery cells defining a space therebetween, the outer peripheral wall portion of the bracket extending within the space, and the rib portion extending between a pair of the second planar surfaces of the cell main bodies;
at least one bus bar coupled to the bracket within the space so as to electrically connect the respective pair of electrode terminals; and
a connector coupled to the terminals and including insertion portions for electrically connecting terminals of the same pole in parallel and terminals of different poles in series.

2. The battery unit according to claim 1, wherein the pair of plane-shaped electrode terminals is formed so as to be extended outward from both side surfaces of the cell main body, and
two battery cells are mounted on the bracket in the state in which the cell main bodies having convex shapes from the first planar surface, along which the electrode terminals are provided so as to be extended, are combined with each other.

3. The battery unit according to claim 1, wherein the inner peripheral side surface of the outer peripheral wall portion of the bracket is formed so that a predetermined gap is provided between the outer peripheral side surface of the battery cell and the inner peripheral side surface when the battery cell is mounted on the bracket, and a depth of the outer peripheral wall portion of the bracket to the support body is formed so as to be higher than the thickness of the battery cell.

4. The battery unit according to claim 1, wherein when two battery cells are mounted on the bracket, either the electrode terminals of the same poles or the electrode terminals of different poles of two battery cells selectively face each other.

5. The battery unit according to claim 1, further comprising:
two electrode members that are electrically connected to the battery cell,
wherein two electrode members are mounted on both side surfaces of the bracket by a fixing method using pressure fitting and a claw.

6. The battery unit according to claim 5, wherein the electrode member has two ends, a terminal electrically connected to the outside is provided on one end of the electrode member, and a through hole is formed at the other end of the electrode member.

7. The battery unit according to claim 6, wherein the terminal of the electrode member has a structure in which a metal plate material is folded back.

8. The battery unit according to claim 1, wherein a convex portion is formed on one surface of a front surface and a back surface of the bracket, and a concave portion is formed on the other surface corresponding to the opposite side of the convex portion.

9. The battery unit according to claim 1, further comprising:
a cooling case that is mounted so as to surround at least front surface sides and back surface sides of two battery cells and a bottom surface of the bracket.

10. The battery unit according to claim 9, further comprising:
a heat conduction sheet that comes into close contact between two battery cells and the cooling case.

11. The battery unit according to claim 9, further comprising:
electrode members that are electrically connected to the electrode terminals of two battery cells; and
an insulation sheet that insulates between the electrode terminals, the electrode members and the cooling case.

* * * * *